US011378862B2

(12) United States Patent
Yan et al.

(10) Patent No.: US 11,378,862 B2
(45) Date of Patent: Jul. 5, 2022

(54) OPTICAL AXIS TUNABLE LIQUID CRYSTAL LENS, ELECTRONIC APPARATUS, DISPLAY APPARATUS, AND METHOD OF OPERATING OPTICAL AXIS TUNABLE LIQUID CRYSTAL LENS

(71) Applicant: BOE Technology Group Co., Ltd., Beijing (CN)

(72) Inventors: Rongjian Yan, Beijing (CN); Li Tian, Beijing (CN); Zhidong Wang, Beijing (CN); Lijia Zhou, Beijing (CN); Quanguo Zhou, Beijing (CN); Junrui Zhang, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 406 days.

(21) Appl. No.: 16/486,016

(22) PCT Filed: Jan. 3, 2019

(86) PCT No.: PCT/CN2019/070268
§ 371 (c)(1),
(2) Date: Aug. 14, 2019

(87) PCT Pub. No.: WO2020/062703
PCT Pub. Date: Apr. 2, 2020

(65) Prior Publication Data
US 2021/0364882 A1     Nov. 25, 2021

(30) Foreign Application Priority Data

Sep. 29, 2018    (CN) .......................... 201811148115.X

(51) Int. Cl.
*G02F 1/29* (2006.01)
*G02F 1/00* (2006.01)

(52) U.S. Cl.
CPC ............ *G02F 1/294* (2021.01); *G02F 1/0063* (2013.01); *G02F 2201/123* (2013.01)

(58) Field of Classification Search
None
See application file for complete search history.

(56) References Cited

U.S. PATENT DOCUMENTS 8,125,581 B2    2/2012   Kim et al.
2009/0153754 A1    6/2009   Jung
(Continued)

FOREIGN PATENT DOCUMENTS

CN     101464578 A    6/2009
CN     102944960 A    2/2013
(Continued)

OTHER PUBLICATIONS

First Office Action in the Chinese Patent Application No. 201811148115. X, dated Apr. 23, 2020; English translation attached.
(Continued)

*Primary Examiner* — Ashok Patel
(74) *Attorney, Agent, or Firm* — Intellectual Valley Law, P.C.

(57) ABSTRACT

An optical axis tunable liquid crystal lens includes a liquid crystal layer; and a control electrode configured to adjust an optical axis of the optical axis tunable liquid crystal lens. The control electrode includes a first electrode configured to be provided with a common voltage signal and a second electrode configured to be provided with a control voltage signal. The first electrode is on a side of the liquid crystal layer away from the second electrode. The second electrode includes a first sub-electrode and a second sub-electrode spaced apart from each other and being on two opposite sides with respect to a center of the second electrode, the first sub-electrode and the second sub-electrode being indepen- (Continued)

dently addressable, the first sub-electrode configured to be provided with a first voltage signal and the second sub-electrode configured to be provided with a second voltage signal.

20 Claims, 9 Drawing Sheets

(56) References Cited

U.S. PATENT DOCUMENTS

| | | | |
|---|---|---|---|
| 2013/0314632 A1 | 11/2013 | Asatryan et al. | |
| 2014/0049682 A1* | 2/2014 | Galstian | G02F 1/133784 348/356 |
| 2016/0011431 A1* | 1/2016 | Kashiwagi | G02F 1/134336 349/15 |

FOREIGN PATENT DOCUMENTS

| | | |
|---|---|---|
| CN | 103969911 A | 8/2014 |
| CN | 104298026 A | 1/2015 |
| CN | 104503147 A | 4/2015 |
| CN | 105259725 A | 1/2016 |
| CN | 106647060 A | 5/2017 |
| JP | 2006091392 A | 4/2006 |
| WO | 2010052869 A1 | 5/2010 |

OTHER PUBLICATIONS

International Search Report & Written Opinion dated Jul. 5, 2019, regarding PCT/CN2019/070268.
S. Sato, "Liquid-crystal lens-cells with variable focal length", Japanese Journal of Applied Physics, vol. 18, No. 9, Sep. 1979, pp. 1679-1684.
M. Ye et al., "Low-voltage-driving liquid crystal lens", Japanese Journal of Applied Physics, 49, 2010, 100204.

* cited by examiner

OPTICAL AXIS TUNABLE LIQUID CRYSTAL LENS, ELECTRONIC APPARATUS, DISPLAY APPARATUS, AND METHOD OF OPERATING OPTICAL AXIS TUNABLE LIQUID CRYSTAL LENS

CROSS-REFERENCE TO RELATED APPLICATION

This application is a national stage application under 35 U.S.C. § 371 of International Application No. PCT/CN2019/070268, filed Jan. 3, 2019, which claims priority to Chinese Patent Application No. 201811148115.X, filed Sep. 29, 2018, the contents of which are incorporated by reference in the entirety.

TECHNICAL FIELD

The present invention relates to optical technology, more particularly, to an optical axis tunable liquid crystal lens, an electronic apparatus, a display apparatus, and a method of operating an optical axis tunable liquid crystal lens.

BACKGROUND

Liquid crystal lens can control the direction of light by adjusting the alignment of liquid crystal molecules, thereby focusing or diverging light. The liquid crystal lens has a simple structure and is easy to operate, and has found a wide range of applications in numerous optical devices.

SUMMARY

In one aspect, the present invention provides an optical axis tunable liquid crystal lens, comprising a liquid crystal layer; and a control electrode configured to adjust an optical axis of the optical axis tunable liquid crystal lens; wherein the control electrode comprises a first electrode configured to be provided with a common voltage signal and a second electrode configured to be provided with a control voltage signal; the first electrode is on a side of the liquid crystal layer away from the second electrode; and the second electrode comprises a first sub-electrode and a second sub-electrode spaced apart from each other and being on two opposite sides with respect to a center of the second electrode, the first sub-electrode and the second sub-electrode being independently addressable, the first sub-electrode configured to be provided with a first voltage signal and the second sub-electrode configured to be provided with a second voltage signal.

Optionally, the control electrode further comprises a central electrode on a side of the liquid crystal layer away from the first electrode, the central electrode configured to be provided with a central voltage signal different from the first voltage signal and the second voltage signal; and wherein an orthographic projection of the first sub-electrode on the liquid crystal layer and an orthographic projection of the second sub-electrode on the liquid crystal layer are respectively on two opposite sides of an orthographic projection of the central electrode on the liquid crystal layer.

Optionally, the central electrode and the second electrode are in a same layer.

Optionally, the first sub-electrode and the second sub-electrode have a centro-symmetry with respect to the central electrode.

Optionally, the second electrode comprises a total number of N sub-electrodes, N≥3; orthographic projections of the N sub-electrodes on the liquid crystal layer surround the orthographic projection of the central electrode on the liquid crystal layer; and the orthographic projections of the N sub-electrodes on the liquid crystal layer are equally spaced apart from each other.

Optionally, the N sub-electrodes further comprises a third sub-electrode and a fourth sub-electrode; and wherein an orthographic projection of the third sub-electrode on the liquid crystal layer and an orthographic projection of the fourth sub-electrode on the liquid crystal layer are respectively on two opposite sides of the orthographic projection of the central electrode on the liquid crystal layer.

Optionally, the central electrode is a circular-shaped electrode.

Optionally, the first electrode and the central electrode are substantially transparent electrodes.

In another aspect, the present invention provides an electronic apparatus comprising the optical axis tunable liquid crystal lens described herein or fabricated by a method described herein.

In another aspect, the present invention provides a display apparatus, comprising multiple ones of the optical axis tunable liquid crystal lens described herein or fabricated by a method described herein, and a display panel having a plurality of subpixels; wherein light emitted from the plurality of subpixels is configured to transmit through the multiple ones of the optical axis tunable liquid crystal lens In another aspect, the present invention provides a method of operating an optical axis tunable liquid crystal lens, comprising providing a liquid crystal lens comprising a liquid crystal layer and a control electrode, the control electrode comprising a first electrode and a second electrode, the first electrode is on a side of the liquid crystal layer away from the second electrode, the second electrode comprising a first sub-electrode and a second sub-electrode spaced apart from each other and being on two opposite sides with respect to a center of the second electrode, the first sub-electrode and the second sub-electrode being independently addressable; applying a common voltage signal to the first electrode; applying a first voltage signal to the first sub-electrode; applying a second voltage signal to the second sub-electrode; and adjusting a relative position of an optical axis of the liquid crystal lens comprising independently adjusting a first voltage difference between the common voltage signal and the first voltage signal and a second voltage difference between the common voltage signal and the second voltage signal.

Optionally, adjusting the optical axis of the liquid crystal lens comprises adjusting a difference between the first voltage difference and the second voltage difference; and wherein the optical axis is shifted toward the first sub-electrode relative to the second sub-electrode when the first voltage difference is increased relative to the second voltage difference.

Optionally, adjusting the optical axis of the liquid crystal lens comprises controlling the first voltage difference to be greater than the second voltage difference thereby rendering a first shortest distance between the optical axis and an edge of the first sub-electrode on a plane containing the first sub-electrode and the second sub-electrode to be less than a second shortest distance between the optical axis and an edge of the second sub-electrode on the plane containing the first sub-electrode and the second sub-electrode.

Optionally, the control electrode further comprises a central electrode on a side of the liquid crystal layer away from the first electrode, an orthographic projection of the first sub-electrode on the liquid crystal layer and an orthographic projection of the second sub-electrode on the liquid crystal layer being respectively on two opposite sides of an orthographic projection of the central electrode on the liquid crystal layer; the method further comprises applying a central voltage signal to the central electrode.

Optionally, the second electrode comprises a total number of N sub-electrodes, N≥2; orthographic projections of the N sub-electrodes on the liquid crystal layer surround the orthographic projection of the central electrode on the liquid crystal layer; and the orthographic projections of the N sub-electrodes on the liquid crystal layer are equally spaced apart from each other; wherein the method comprises forming a convex liquid crystal lens by controlling a central voltage difference between the central voltage signal and the common voltage signal to be less than a voltage difference between the common voltage signal and a voltage signal applied to any one of the N sub-electrodes.

Optionally, the second electrode comprises a total number of N sub-electrodes, N≥2; orthographic projections of the N sub-electrodes on the liquid crystal layer surround the orthographic projection of the central electrode on the liquid crystal layer; and the orthographic projections of the N sub-electrodes on the liquid crystal layer are equally spaced apart from each other; wherein the method comprises forming a concave liquid crystal lens by controlling a central voltage difference between the central voltage signal and the common voltage signal to be greater than a voltage difference between the common voltage signal and a voltage signal applied to any one of the N sub-electrodes.

Optionally, the second electrode further comprises a third sub-electrode and a fourth sub-electrode and being on two opposite sides with respect to the center of the second electrode, the third sub-electrode and the fourth sub-electrode being independently addressable; wherein the method comprises applying a third voltage signal to the third sub-electrode; and applying a fourth voltage signal to the fourth sub-electrode; wherein adjusting the relative position of the optical axis of the liquid crystal lens further comprises independently adjusting a third voltage difference between the common voltage signal and the third voltage signal and a fourth voltage difference between the common voltage signal and the fourth voltage signal.

Optionally, adjusting the optical axis of the liquid crystal lens comprises adjusting a difference between the first voltage difference and the second voltage difference, and adjusting a difference between the third voltage difference and the fourth voltage difference; and wherein the optical axis is shifted toward the first sub-electrode relative to the second sub-electrode when the first voltage difference is increased relative to the second voltage difference, and shifted toward the third sub-electrode relative to the fourth sub-electrode when the third voltage difference is increased relative to the fourth voltage difference.

Optionally, adjusting the optical axis of the liquid crystal lens comprises controlling the first voltage difference to be greater than the second voltage difference thereby rendering a first shortest distance between the optical axis and an edge of the first sub-electrode on a plane containing the first sub-electrode and the second sub-electrode to be less than a second shortest distance between the optical axis and an edge of the second sub-electrode on the plane containing the first sub-electrode and the second sub-electrode, and controlling the third voltage difference to be greater than the fourth voltage difference thereby rendering a third shortest distance between the optical axis and an edge of the third sub-electrode on a plane containing the third sub-electrode and the fourth sub-electrode to be less than a fourth shortest distance between the optical axis and an edge of the fourth sub-electrode on the plane containing the third sub-electrode and the fourth sub-electrode.

Optionally, the control electrode further comprises a central electrode on a side of the liquid crystal layer away from the first electrode; an orthographic projection of the first sub-electrode on the liquid crystal layer and an orthographic projection of the second sub-electrode on the liquid crystal layer are respectively on a first side and a second side of an orthographic projection of the central electrode on the liquid crystal layer, the first side being opposite to the second side; and an orthographic projection of the third sub-electrode on the liquid crystal layer and an orthographic projection of the fourth sub-electrode on the liquid crystal layer are respectively on a third side and a fourth side of the orthographic projection of the central electrode on the liquid crystal layer, the third side being opposite to the fourth side; the method further comprises applying a central voltage signal to the central electrode.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

It is discovered in the present disclosure that, in the manufacturing process of the liquid crystal lens, actual values of certain parameters may deviate from design values due to factors such as process precision. These parameters include, for example, the position, shape, and size of the electrodes and other components. The deviation causes the optical axis of the liquid crystal lens to deviate from the intended position, which adversely affects the optical function of the liquid crystal lens.

Accordingly, the present disclosure provides, inter alga, an optical axis tunable liquid crystal lens, an electronic apparatus, a display apparatus, and a method of operating an optical axis tunable liquid crystal lens that substantially obviate one or more of the problems due to limitations and disadvantages of the related art. In one aspect, the present disclosure provides an optical axis tunable liquid crystal lens. In some embodiments, the optical axis tunable liquid crystal lens includes a liquid crystal layer; and a control electrode configured to adjust an optical axis of the optical axis tunable liquid crystal lens. Optionally, the control electrode includes a first electrode and a second electrode. Optionally, the first electrode is on a side of the liquid crystal layer away from the second electrode. Optionally, the second electrode includes a first sub-electrode and a second sub-electrode spaced apart from each other and being on two opposite sides with respect to a center of the second electrode. The first sub-electrode and the second sub-electrode are independently addressable.

Figure 1A:
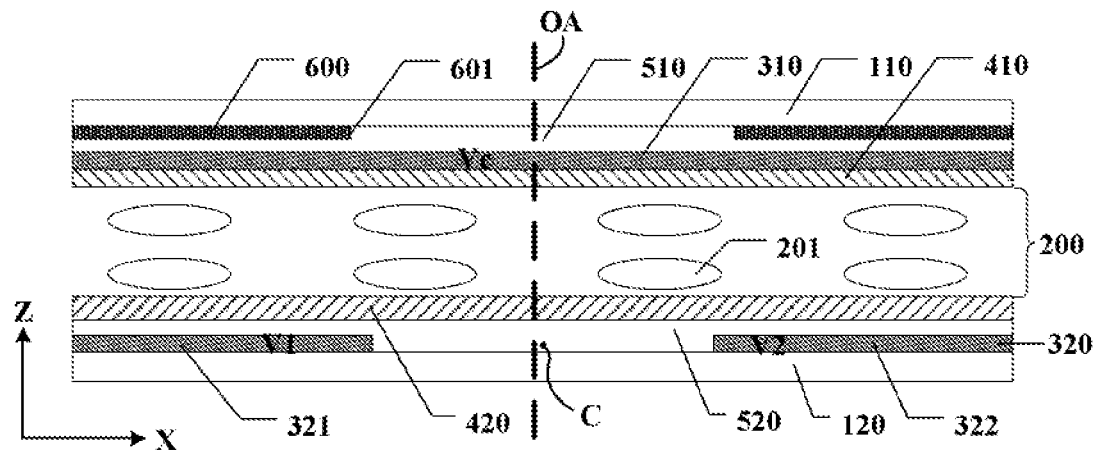
FIG. 1A is a cross-sectional view of an optical axis tunable liquid crystal lens in some embodiments according to the present disclosure.

FIG. 1A is a cross-sectional view of an optical axis tunable liquid crystal lens in some embodiments according to the present disclosure. Referring to FIG. 1A, the optical axis tunable liquid crystal lens in some embodiments includes a liquid crystal layer 200 including a plurality of liquid crystal molecules 201, and a control electrode configured to adjust an optical axis of the optical axis tunable liquid crystal lens. The control electrode in some embodiments includes a first electrode 310 and a second electrode 320. The first electrode 310 and the second electrode 320 are respectively on two opposite sides of the liquid crystal layer 200. For example, the first electrode 310 is on a side of the liquid crystal layer 200 away from the second electrode 320, and the liquid crystal layer 200 is between the first electrode 310 and the second electrode 320. In some embodiments, the second electrode 320 includes a first sub-electrode 321 and a second sub-electrode 322 spaced apart from each other (and insulated from each other). The first sub-electrode 321 and the second sub-electrode 322 are on two opposite sides with respect to a center C of the second electrode 320. In the present optical axis tunable liquid crystal lens, the first sub-electrode 321 and the second sub-electrode 322 are independently addressable.

Referring to FIG. 1A, in some embodiments, the optical axis tunable liquid crystal lens further includes a first base substrate 110 and a second base substrate 120 facing the first base substrate 110. The first base substrate 110 and the second base substrate 120 are respectively on two opposite sides of the liquid crystal layer 200. For example, the first base substrate 110 is on a side of the liquid crystal layer 200 away from the second base substrate 120, and the liquid crystal layer 200 is between the first base substrate 110 and the second base substrate 120. Optionally, the first electrode 310 is disposed on the first base substrate 110, for example, the first electrode 310 is between the first base substrate 110 and the liquid crystal layer 200. Optionally, the second electrode 320 is disposed on the second base substrate 120, for example, the second electrode 320 is between the second base substrate 120 and the liquid crystal layer 200.

In some embodiments, the first electrode 310 is configured to be provided with a common voltage signal Vc (e.g., the first electrode 310 is a common electrode), and the second electrode 320 is configured to be provided with a control voltage signal. Optionally, the first sub-electrode is configured to be provided with a first voltage signal V1, the second sub-electrode is configured to be provided with a second voltage signal V2, and optionally the second voltage signal is different from the first voltage signal.

In some embodiments, when the common voltage signal is applied to the first electrode 310, and the control voltage signal is applied to the second electrode 320, a vertical electric field is formed between the first electrode 310 and the second electrode 320. The plurality of liquid crystal molecules 201 undergo rotation under the influence of the electric field formed between the first electrode 310 and the second electrode 320, which in turn results in a change in the refractive index of the liquid crystal layer 200 where the plurality of liquid crystal molecules 201 undergo rotation. By adjusting the voltage signals respectively applied to the first electrode 310 and the second electrode 320 (including the voltages signals respectively applied to the first sub-electrode 321 and the second sub-electrode 322), the electric filed distribution of the vertical electric field can be adjusted. For example, a first voltage difference between the common voltage signal Vc and the first voltage signal V1 and a second voltage difference between the common voltage signal Vc and the second voltage signal V2 can be adjusted, thereby adjusting the liquid crystal molecule rotation in different regions of the liquid crystal layer 200, and the refractive indexes in different regions of the liquid crystal layer 200. In doing so, a desired distribution of the refractive index throughout different regions of the liquid crystal layer 200 can be achieved, thereby forming the optical axis tunable liquid crystal lens. Moreover, by adjusting the first voltage difference and the second voltage difference, a relative position of the optical axis OA of the optical axis tunable liquid crystal lens can be accordingly adjusted.

Figure 1B:
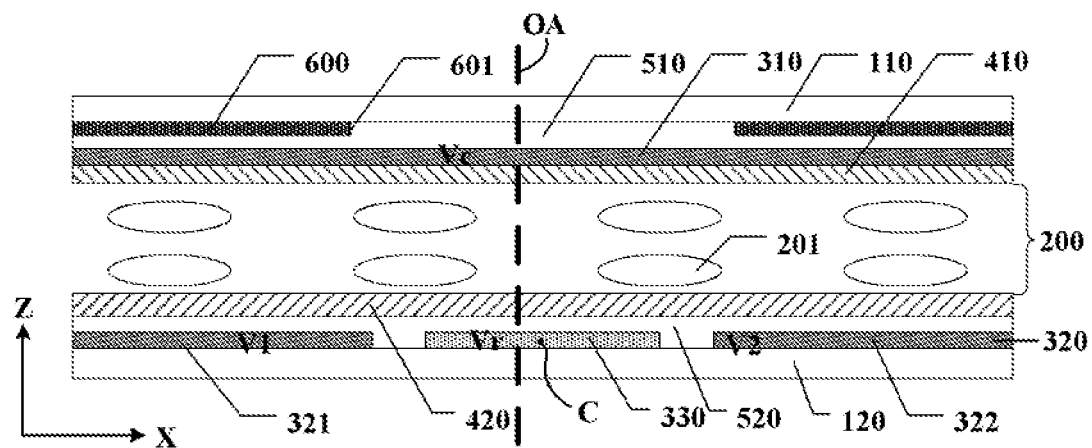
FIG. 1B is a cross-sectional view of an optical axis tunable liquid crystal lens in some embodiments according to the present disclosure.

FIG. 1B is a cross-sectional view of an optical axis tunable liquid crystal lens in some embodiments according to the present disclosure. Referring to FIG. 1B, in some embodiments, the control electrode further includes a central electrode 330 on a side of the liquid crystal layer 200 away from the first electrode 310. Optionally, the central electrode 330 is configured to be provided with a central voltage signal Vr different from the first voltage signal V1 and the second voltage signal V2. Optionally, the central electrode 330 is in a same layer as the second electrode 320. For example, the central electrode 330 is in a same layer as the first sub-electrode 321 and the second sub-electrode 322.

As used herein, the term "same layer" refers to the relationship between the layers simultaneously formed in the same step. In one example, the central electrode 330 and the second electrode 320 are in a same layer when they are formed as a result of one or more steps of a same patterning process performed in a same layer of material. In another example, the central electrode 330 and the second electrode 320 can be formed in a same layer by simultaneously performing the step of forming the central electrode 330 and the step of forming the second electrode 320. The term "same layer" does not always mean that the thickness of the layer or the height of the layer in a cross-sectional view is the same.

In some embodiments, the first sub-electrode 321 and the second sub-electrode 322 have a centro-symmetry with respect to the center C of the second electrode 320. Optionally, the first sub-electrode 321 and the second sub-electrode 322 have a centro-symmetry with respect to the central electrode 330.

In some embodiments, the first electrode 310 is on a first side of the liquid crystal layer 200, and the second electrode 320 and the central electrode 330 are on a second side of the liquid crystal layer 200, the first side and the second side being two opposite sides of the liquid crystal layer 200. For example, the first electrode 310 is on a side of the liquid crystal layer 200 away from the second electrode 320 and the central electrode 330. In some embodiments, the second electrode 320 includes a first sub-electrode 321 and a second sub-electrode 322 spaced apart from each other (and insulated from each other). The first sub-electrode 321 and the second sub-electrode 322 are spaced apart from the central electrode 330 (and insulated from the central electrode 330). Optionally, an orthographic projection of the first sub-electrode 321 on the liquid crystal layer 200 and an orthographic projection of the second sub-electrode 322 on the liquid crystal layer 200 are respectively on two opposite sides of an orthographic projection of the central electrode 330 on the liquid crystal layer 200. Optionally, an orthographic projection of the second electrode 320 on the liquid crystal layer 200 substantially surrounds the orthographic projection of the central electrode 330 on the liquid crystal layer 200. As used herein the term "substantially surround" refers to surrounding at least 50% (e.g., at least 60%, at least 70%, at least 80%, at least 90%, at least 95%, at least 99%, and 100%) of a perimeter of an area.

In some embodiments, when the common voltage signal is applied to the first electrode 310, the control voltage signal is applied to the second electrode 320, and a central voltage signal Vr is applied to the central electrode 330. Accordingly, a vertical electric field is formed between the first electrode 310 and the second electrode 320, and a horizontal electric field is formed between the second electrode 320 and the central electrode 330. The plurality of liquid crystal molecules 201 undergo rotation under the influence of the vertical electric field formed between the first electrode 310 and the second electrode 320, and the horizontal electric field formed between the second electrode 320 and the central electrode 330. As a result, the refractive index of the liquid crystal layer 200 undergoes a change where the plurality of liquid crystal molecules 201 undergo rotation. By adjusting the voltage signals respectively applied to the first electrode 310, the second electrode 320 (including the voltages signals respectively applied to the first sub-electrode 321 and the second sub-electrode 322), and the central electrode 330, respectively, the electric filed distribution of the vertical electric field and the horizontal electric field can be adjusted. Voltage differences among the first electrode 310, the second electrode 320, and the central electrode 330 can be adjusted. For example, a first voltage difference between the common voltage signal Vc and the first voltage signal V1, a second voltage difference between the common voltage signal Vc and the second voltage signal V2, and a central voltage difference between the central voltage signal Vr and the common voltage signal Vc, can be adjusted, thereby adjusting the liquid crystal molecule rotation in different regions of the liquid crystal layer 200, and the refractive indexes in different regions of the liquid crystal layer 200. In doing so, a desired distribution of the refractive index throughout different regions of the liquid crystal layer 200 can be achieved, thereby forming the optical axis tunable liquid crystal lens. Moreover, by adjusting the first voltage difference, the second voltage difference, and the central voltage difference, as well as relative relationships therebetween, a relative position of the optical axis OA of the optical axis tunable liquid crystal lens can be accordingly adjusted. In the context of the present disclosure, the vertical electric field and the horizontal electric field are relative to a plane parallel to the first base substrate 110 and the second base substrate 120. In one example, a direction of the electric field lines of the vertical electric field is substantially perpendicular to the plane parallel to the first base substrate 110 and the second base substrate 120. In another example, a direction of the electric field lines of the horizontal electric field is substantially parallel to the plane parallel to the first base substrate 110 and the second base substrate 120.

In some embodiments, an orthographic projection of the second electrode 320 on the liquid crystal layer 200 at least partially overlaps with an orthographic projection of the first electrode 310 on the liquid crystal layer 200, and an orthographic projection of the central electrode 330 on the liquid crystal layer 200 at least partially overlaps with the orthographic projection of the first electrode 310 on the liquid crystal layer 200. Optionally, referring to FIG. 1B, the orthographic projection of the first electrode 310 on the liquid crystal layer 200 covers the orthographic projection of the second electrode 320 on the liquid crystal layer 200, and covers the orthographic projection of the central electrode 330 on the liquid crystal layer 200.

In some embodiments, the orthographic projection of the first electrode 310 on the liquid crystal layer 200 covers the orthographic projection of the central electrode 330 on the liquid crystal layer 200, and the orthographic projection of the second electrode 320 on the liquid crystal layer 200 is non-overlapping with the orthographic projection of the first electrode 310 on the liquid crystal layer 200.

Referring to FIG. 1B, when the first voltage signal V1, the second voltage signal V2, and the central voltage signal Vr are substantially the same, a horizontal electric field between the second electrode 320 and the central electrode 330 is absent, and the plurality of liquid crystal molecules 201 in the liquid crystal layer 200 are rotated to a substantially same degree, e.g., the refractive index across the liquid crystal layer 200 is substantially the same.

Figure 2A:
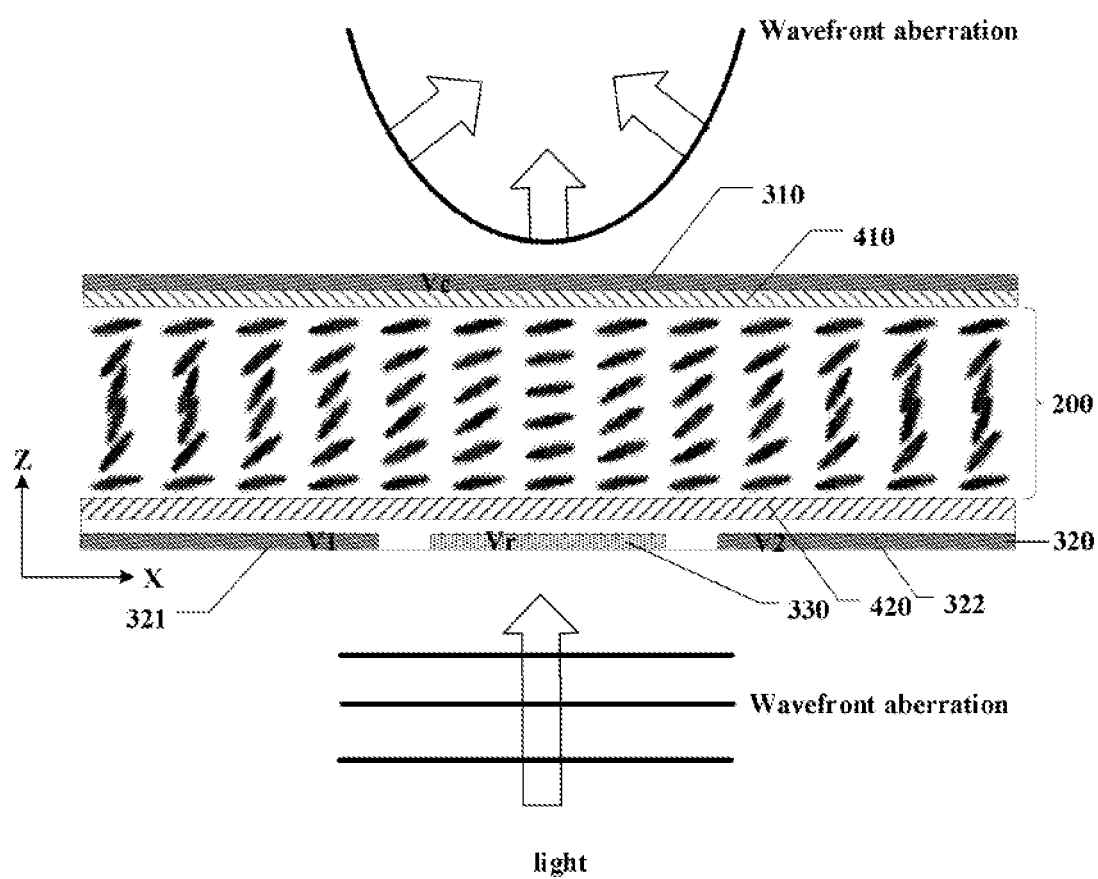
FIG. 2A illustrates a working principle of an optical axis tunable liquid crystal lens in some embodiments according to the present disclosure.

In some embodiments, the second electrode 320 includes a total number of N sub-electrodes, N≥2. Optionally, orthographic projections of the N sub-electrodes on the liquid crystal layer 200 surround the orthographic projection of the central electrode 330 on the liquid crystal layer 200. The orthographic projections of the N sub-electrodes on the liquid crystal layer 200 are equally spaced apart from each other. In some embodiments, a central voltage difference between the central voltage signal Vr and the common voltage signal Vc is controlled to be less than a voltage difference between the common voltage signal Vc and a voltage signal applied to any one of the N sub-electrodes. Accordingly, a convex liquid crystal lens is formed. FIG. 2A illustrates a working principle of an optical axis tunable liquid crystal lens in some embodiments according to the present disclosure. Referring to FIG. 2A, the central voltage difference between the central voltage signal Vr and the common voltage signal Vc is controlled to be less than a first voltage difference between the first voltage signal V1 and the common voltage signal Vc, and less than a second voltage difference between the second voltage signal V2 and the common voltage signal Vc.

Referring to FIG. 2A, the electric field strength (e.g., the vertical electric field strength) gradually decreases along a direction from the first sub-electrode 321 to the central electrode 330, and gradually decreases along a direction from the second sub-electrode 322 to the central electrode 330. Correspondingly, the refractive index of the liquid crystal layer gradually increases along the direction from the first sub-electrode 321 to the central electrode 330, and gradually increases along the direction from the second sub-electrode 322 to the central electrode 330. As shown in FIG. 2A, after the wavefront aberration passes through the liquid crystal layer 200, the cross-sectional shape of the wavefront aberration changes from a straight-line segment to a curved segment. The wavefront aberration in a region corresponding to the central electrode 330 is the greatest. Thus, the liquid crystal layer 200 focuses light transmitting through the liquid crystal layer 200, e.g., the liquid crystal layer 200 has a converging effect on the light transmitting through the liquid crystal layer 200, thereby forming a positive liquid crystal lens (equivalent to a convex liquid crystal lens) having a substantially uniform thickness.

Figure 2B:
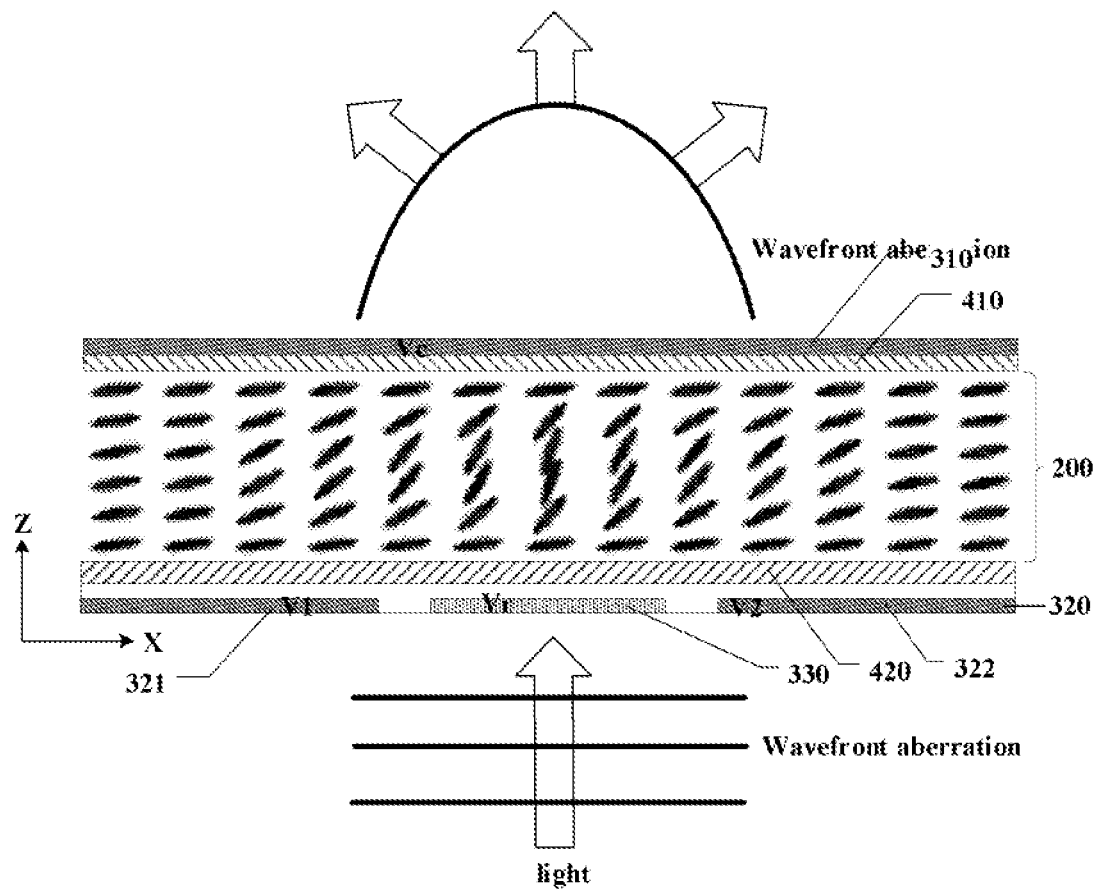
FIG. 2B illustrates a working principle of an optical axis tunable liquid crystal lens in some embodiments according to the present disclosure.

In some embodiments, the second electrode 320 includes a total number of N sub-electrodes, N≥2. Optionally, orthographic projections of the N sub-electrodes on the liquid crystal layer 200 surround the orthographic projection of the central electrode 330 on the liquid crystal layer 200. The orthographic projections of the N sub-electrodes on the liquid crystal layer 200 are equally spaced apart from each other. In some embodiments, a central voltage difference between the central voltage signal Vr and the common voltage signal Vc is controlled to be greater than a voltage difference between the common voltage signal Vc and a voltage signal applied to any one of the N sub-electrodes. Accordingly, a concave liquid crystal lens is formed. FIG. 2B illustrates a working principle of an optical axis tunable liquid crystal lens in some embodiments according to the present disclosure. Referring to FIG. 2B, the central voltage difference between the central voltage signal Vr and the common voltage signal Vc is controlled to be greater than a first voltage difference between the first voltage signal V1 and the common voltage signal Vc, and greater than a second voltage difference between the second voltage signal V2 and the common voltage signal Vc.

Referring to FIG. 2B, the electric field strength (e.g., the vertical electric field strength) gradually increases along a direction from the first sub-electrode 321 to the central electrode 330, and gradually increases along a direction from the second sub-electrode 322 to the central electrode 330. Correspondingly, the refractive index of the liquid crystal layer gradually decreases along the direction from the first sub-electrode 321 to the central electrode 330, and gradually decreases along the direction from the second sub-electrode 322 to the central electrode 330. As shown in FIG. 2B, after the wavefront aberration passes through the liquid crystal layer 200, the cross-sectional shape of the wavefront aberration changes from a straight-line segment to a curved segment. The wavefront aberration in regions corresponding to sub-electrodes of the second electrode 320 is the greatest. Thus, the liquid crystal layer 200 diverts light transmitting through the liquid crystal layer 200, e.g., the liquid crystal layer 200 has a diverging effect on the light transmitting through the liquid crystal layer 200, thereby forming a negative liquid crystal lens (equivalent to a concave liquid crystal lens) having a substantially uniform thickness.

Optionally, the second electrode 320 and the central electrode 330 are in different layers. Optionally, the second electrode 320 is in a layer between the central electrode 330 and the second base substrate 120. Optionally, the central electrode 330 is in a layer between the second electrode 320 and the second base substrate 120.

Optionally, the second electrode 320 and the central electrode 330 are in a same layer. Optionally, the second electrode 320 and the central electrode 330 are formed in a single fabricating process using a single mask plate and made of a same material.

Figure 3A:
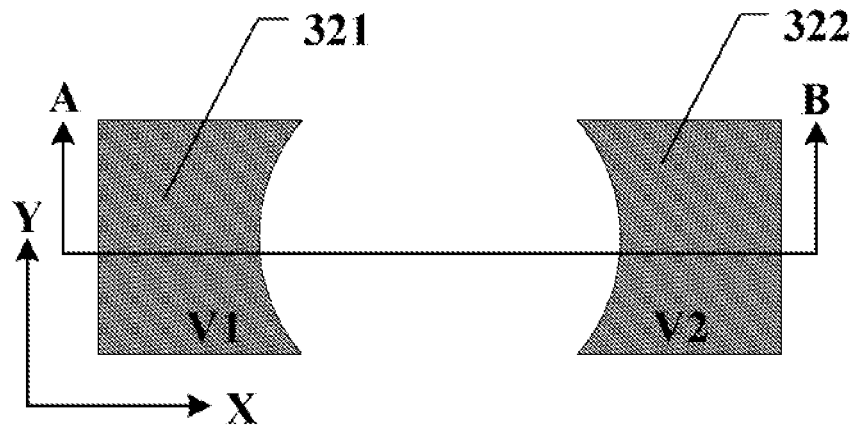
FIG. 3A is a plan view of a second electrode of an optical axis tunable liquid crystal lens in some embodiments according to the present disclosure.

FIG. 3A is a plan view of a second electrode of an optical axis tunable liquid crystal lens in some embodiments according to the present disclosure. Referring to FIG. 3A, in some embodiments, the second electrode 320 includes a first sub-electrode 321 and a second sub-electrode 322. Optionally, the second electrode 320 has a centro-symmetry, for example, patterns of the first sub-electrode 321 and the second sub-electrode 322 have a centro-symmetry. A direction from the first sub-electrode 321 to the second sub-electrode 322 is substantially parallel to an X-axis. When the first sub-electrode 321 and the second sub-electrode 322 are respectively applied with a first voltage signal V1 and a second voltage signal V2, the optical axis of the optical axis tunable liquid crystal lens can be adjusted, e.g., along a direction parallel to the X-axis.

Figure 3B:
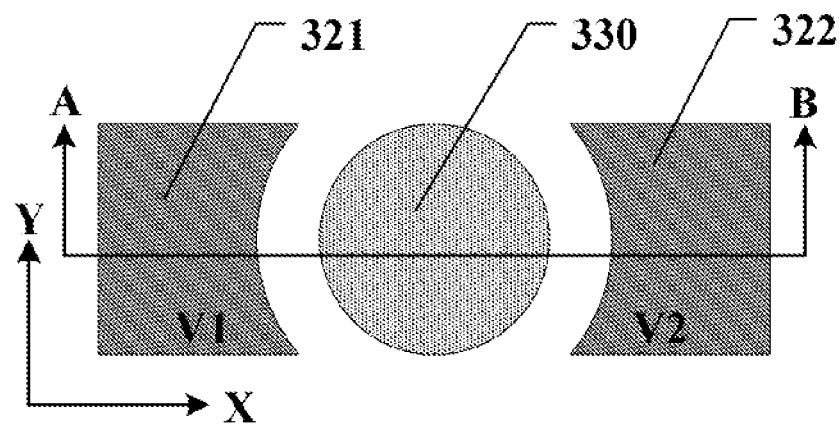
FIG. 3B is a plan view of a second electrode of an optical axis tunable liquid crystal lens in some embodiments according to the present disclosure.

FIG. 3B is a plan view of a second electrode of an optical axis tunable liquid crystal lens in some embodiments according to the present disclosure. Referring to FIG. 3B, in some embodiments, the second electrode 320 includes a first sub-electrode 321 and a second sub-electrode 322. Optionally, the second electrode 320 has a centro-symmetry, for example, the first sub-electrode 321 and the second sub-electrode 322 have a centro-symmetry with respect to the central electrode 330. The first sub-electrode 321 and the second sub-electrode 322 are disposed on two opposite sides of the central electrode 330 in plan view of the second electrode 320. A direction from the first sub-electrode 321 to the second sub-electrode 322 is substantially parallel to an X-axis. When the first sub-electrode 321 and the second sub-electrode 322 are respectively applied with a first voltage signal V1 and a second voltage signal V2, the optical axis of the optical axis tunable liquid crystal lens can be adjusted, e.g., along a direction parallel to the X-axis.

In some embodiments, the second electrode includes a total number of N sub-electrodes, N≥3 (e.g., N=3, 4, 6, or 8). Optionally, orthographic projections of the N sub-electrodes on the liquid crystal layer surround the orthographic projection of the central electrode on the liquid crystal layer. Optionally, the orthographic projections of the N sub-electrodes on the liquid crystal layer are equally spaced apart from each other. The greater N is, and more evenly the N sub-electrodes are distributed surrounding the central electrode 330 (or surrounding the center of the second electrode 320), a horizontal electric field formed between the second electrode 320 and the central electrode 330 can achieve a more even distribution, and the refractive index of the liquid crystal layer 200 undergoes a more even change across different regions of the liquid crystal layer 200, achieving a superior optical property. For example, the convex lens or the concave lens can be formed to have a more regular shape.

In some embodiments, the second electrode includes a first sub-electrode, a second sub-electrode, a third sub-electrode, and a fourth sub-electrode. Optionally, an orthographic projection of the first sub-electrode on the liquid crystal layer and an orthographic projection of the second sub-electrode on the liquid crystal layer are respectively on two opposite sides (e.g., a first side and a second side) of an orthographic projection of the central electrode on the liquid crystal layer; and an orthographic projection of the third sub-electrode on the liquid crystal layer and an orthographic projection of the fourth sub-electrode on the liquid crystal layer are respectively on two opposite sides (e.g., a third side and a fourth side) of the orthographic projection of the central electrode on the liquid crystal layer.

Figure 4A:
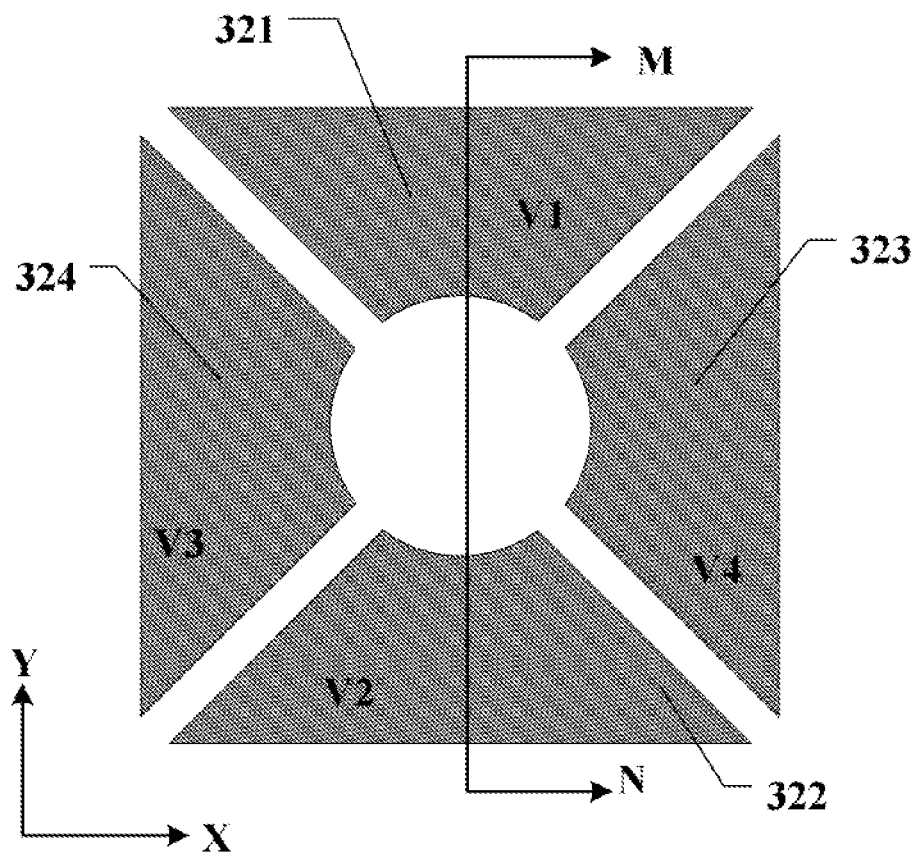
FIG. 4A is a plan view of a second electrode of an optical axis tunable liquid crystal lens in some embodiments according to the present disclosure.

FIG. 4A is a plan view of a second electrode of an optical axis tunable liquid crystal lens in some embodiments according to the present disclosure. Referring to FIG. 4A, the second electrode 320 in some embodiments includes a first sub-electrode 321, a second sub-electrode 322, a third sub-electrode 323, and a fourth sub-electrode 324. A central electrode 330 is absent in the optical axis tunable liquid crystal lens. Optionally, patterns of the first sub-electrode 321, the second sub-electrode 322, the third sub-electrode 323, and the fourth sub-electrode 324 have a centro-symmetry. For example, patterns of the first sub-electrode 321 and the second sub-electrode 322 have a centro-symmetry, and patterns of the third sub-electrode 323 and the fourth sub-electrode 324 have a centro-symmetry. As shown in FIG. 4A, a direction from the first sub-electrode 321 to the second sub-electrode 322 is substantially parallel to the X-axis, and a direction from the third sub-electrode 323 to the fourth sub-electrode 324 is substantially parallel to the Y-axis. In one example, a cross-section along an M-N line corresponds to the cross-sectional view of the optical axis tunable liquid crystal lens as shown in FIG. 1A.

Figure 4B:
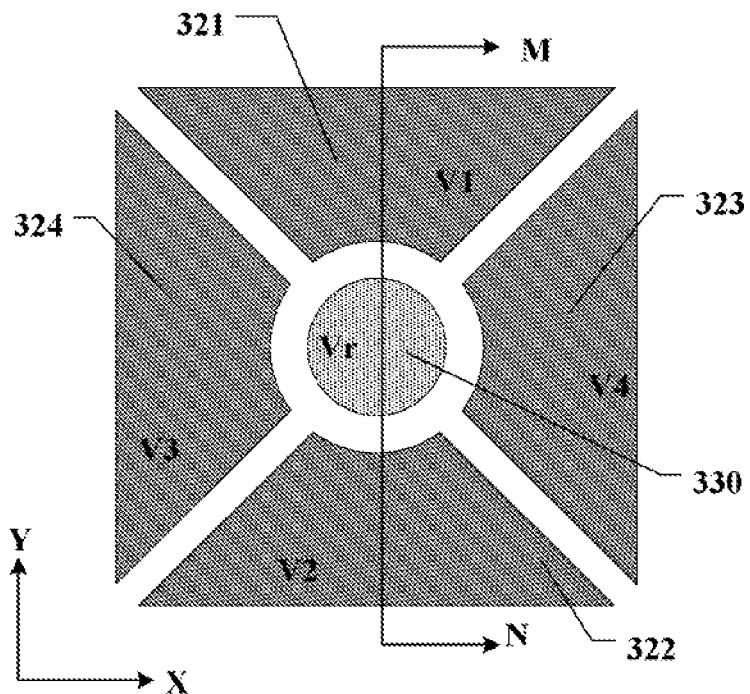
FIG. 4B is a plan view of a second electrode of an optical axis tunable liquid crystal lens in some embodiments according to the present disclosure.

FIG. 4B is a plan view of a second electrode of an optical axis tunable liquid crystal lens in some embodiments according to the present disclosure. Referring to FIG. 4A, the second electrode 320 in some embodiments includes a first sub-electrode 321, a second sub-electrode 322, a third sub-electrode 323, and a fourth sub-electrode 324; and the control electrode further includes a central electrode 330. The first sub-electrode 321, the second sub-electrode 322, the third sub-electrode 323, and the fourth sub-electrode 324 surround the central electrode 330. Optionally, an orthographic projection of the first sub-electrode 321 on the liquid crystal layer 200 and an orthographic projection of the second sub-electrode 322 on the liquid crystal layer 200 are respectively on two opposite sides (e.g., a first side and a second side) of an orthographic projection of the central electrode 330 on the liquid crystal layer 200; and an orthographic projection of the third sub-electrode 323 on the liquid crystal layer 200 and an orthographic projection of the fourth sub-electrode 324 on the liquid crystal layer 200 are respectively on two opposite sides (e.g., a third side and a fourth side) of the orthographic projection of the central electrode 330 on the liquid crystal layer 200. The first sub-electrode 321 and the second sub-electrode 322 have a centro-symmetry with respect to the central electrode 330, and the third sub-electrode 323 and the fourth sub-electrode 324 have a centro-symmetry with respect to the central electrode 330. As shown in FIG. 4B, a direction from the first sub-electrode 321 to the second sub-electrode 322 is substantially parallel to the X-axis, and a direction from the third sub-electrode 323 to the fourth sub-electrode 324 is substantially parallel to the Y-axis. In one example, a cross-section along an M-N line corresponds to the cross-sectional view of the optical axis tunable liquid crystal lens as shown in FIG. 1B.

Referring to FIG. 4A and FIG. 4B, when the first sub-electrode 321 and the second sub-electrode 322 are respectively applied with a first voltage signal V1 and a second voltage signal V2, the optical axis of the optical axis tunable liquid crystal lens can be adjusted, e.g., along a direction parallel to the X-axis. When the third sub-electrode 323 and the fourth sub-electrode 324 are respectively applied with a third voltage signal V3 and a fourth voltage signal V4, the optical axis of the optical axis tunable liquid crystal lens can be adjusted, e.g., along a direction parallel to the Y-axis. Accordingly, the position of the optical axis of the optical axis tunable liquid crystal lens can be adjusted toward any direction with respect to the center of the second electrode 320 (or with respect to the central electrode 330). By having a total number of four sub-electrodes, the electric field is distributed highly evenly, obviating the needs of using overly complicated driving circuits for providing control voltage to the second electrode 320.

The sub-electrodes of the second electrode 320 may have any appropriate shapes. Optionally, as shown in FIG. 4A and FIG. 4B, an overall outer contour of the second electrode 320 has a substantially rectangular (or square) shape, four sides of which are respectively formed by the first sub-electrode 321, the second sub-electrode 322, the third sub-electrode 323, and the fourth sub-electrode 324.

Figure 5A:
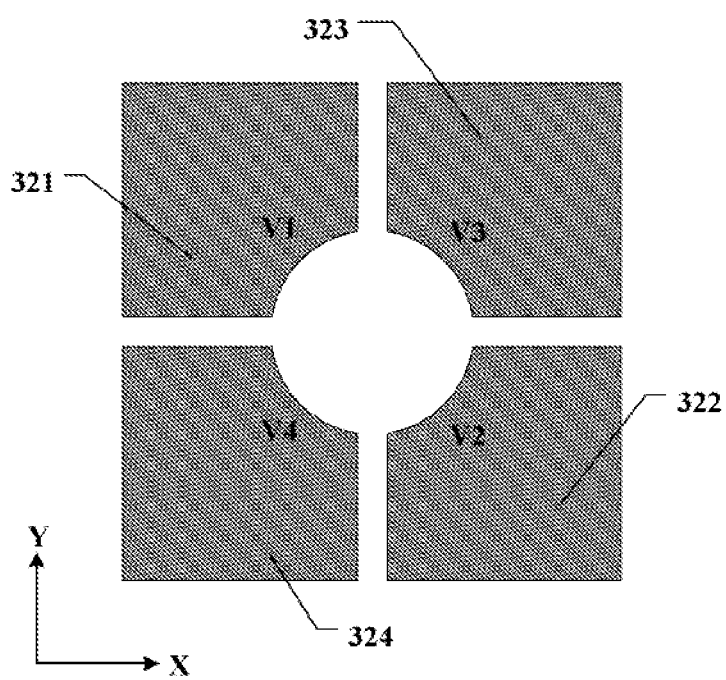
FIG. 5A is a plan view of a second electrode of an optical axis tunable liquid crystal lens in some embodiments according to the present disclosure.
Figure 5B:
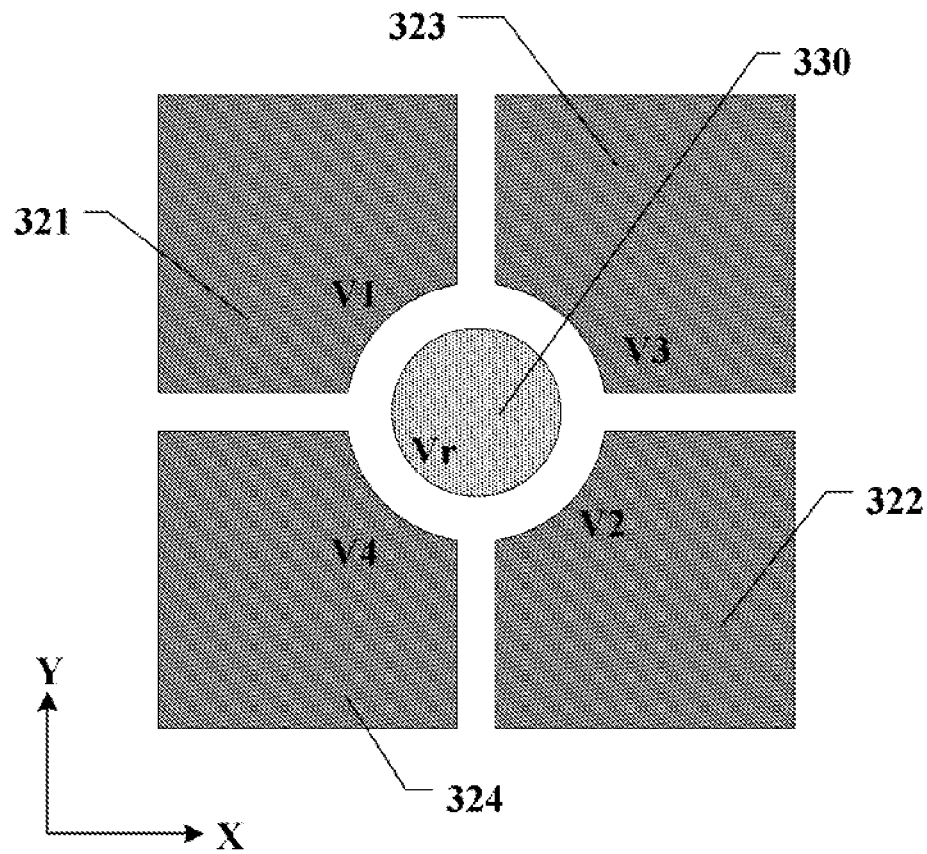
FIG. 5B is a plan view of a second electrode of an optical axis tunable liquid crystal lens in some embodiments according to the present disclosure.

FIG. 5A is a plan view of a second electrode of an optical axis tunable liquid crystal lens in some embodiments according to the present disclosure. FIG. 5B is a plan view of a second electrode of an optical axis tunable liquid crystal lens in some embodiments according to the present disclosure. Referring to FIG. 5A and FIG. 5B, an overall outer contour of the second electrode 320 has a substantially rectangular (or square) shape, four corners of which are respectively formed by the first sub-electrode 321, the second sub-electrode 322, the third sub-electrode 323, and the fourth sub-electrode 324.

The central electrode 330 may have any appropriate shapes such as a circular shape, a rectangular shape, a square shape, a triangular shape, a polygonal shape, and an irregular shape. Optionally, as shown in FIG. 3B, FIG. 4B, and FIG. 5B, the central electrode 330 has a circular shape, which is advantageous for forming an evenly distributed horizontal electric field between the central electrode 330 and the second electrode 320, achieving a superior optical property in the optical axis tunable liquid crystal lens. Correspondingly, a side of a sub-electrode of the second electrode 320 directly adjacent to the central electrode 330 has an arc shape compatible with the circular-shaped central electrode, further enhancing the optical property of the optical axis tunable liquid crystal lens by achieving an even more evenly distributed horizontal electric field.

Optionally, an overall outer contour of the second electrode 320 has a substantially circular shape.

Optionally, the first electrode 310 and the central electrode 330 are substantially transparent electrodes. Optionally, the first electrode 310, the second electrode 320, and the central electrode 330 are substantially transparent electrodes.

Various appropriate conductive materials may be used for fabricating the first electrode 310, the second electrode 320, and the central electrode 330. Examples of appropriate conductive materials include indium tin oxide, indium zinc oxide, indium gallium oxide, gallium zinc oxide, zinc oxide, indium oxide, aluminum zinc oxide, and carbon nanotubes.

Optionally, the first base substrate 110 and the second base substrate 120 are transparent base substrates. Optionally, the first base substrate 110 and the second base substrate 120 are rigid base substrates. Optionally, the first base substrate 110 and the second base substrate 120 are flexible base substrates. Examples of appropriate materials for making the first base substrate 110 and the second base substrate 120 include glass, quartz, and resin. Examples of appropriate resin materials for making the first base substrate 110 and the second base substrate 120 include polyimide, polycarbonate, polyacrylate, polyetherimide, polyethersulfone, polyethylene terephthalate, and polyethylene naphthalate.

Various appropriate liquid crystal molecules may be used for making the liquid crystal layer 200. Examples of appropriate liquid crystal molecules include, e.g., nematic liquid crystal molecules. The liquid crystal layer 200 may be made to have various appropriate thicknesses, refractive indexes, viscosity to achieve a desired focal power and a desired response time. For example, the focal power of the liquid crystal layer 200 is a ratio of the refractive index of the liquid crystal layer 200 to a focal length of the optical axis tunable liquid crystal lens. The more viscous the liquid crystal molecules and the thicker the liquid crystal layer 200, the longer the response time. Optionally, the liquid crystal molecules have a birefringence of equal to or greater than 0.2, and a rotational viscosity coefficient equal to or less than 200 mPas.

In some embodiments, the optical axis tunable liquid crystal lens further includes an alignment film on a side of the liquid crystal layer 200 facing the first base substrate 110, on a side of the liquid crystal layer 200 facing the second base substrate 120, or on both sides. The alignment film is configured to control the alignment of the liquid crystal molecules in the liquid crystal layer 200, e.g., the arrangement direction and angle of the liquid crystal molecules in the liquid crystal layer 200, thereby determining an initial alignment direction of the liquid crystal molecules in the liquid crystal layer 200. Referring to FIG. 1A and FIG. 1B, in some embodiments, the optical axis tunable liquid crystal lens includes a first alignment film 410 and a second alignment film 420. The first alignment film 410 is between the first base substrate 110 and the liquid crystal layer 200, and is in direct contact with the liquid crystal layer 200. The second alignment film 420 is between the second base substrate 120 and the liquid crystal layer 200, and is in direct contact with the liquid crystal layer 200. Optionally, the alignment directions of the first alignment film 410 and the second alignment film 420 are substantially perpendicular to each other. Optionally, the first alignment film 410 and the second alignment film 420 are photo-alignment films. Optionally, the first alignment film 410 and the second alignment film 420 are imprinting-type alignment films (e.g., nano imprinting-type alignment films). Optionally, the first alignment film 410 and the second alignment film 420 are rubbing alignment films prepared by rubbing a polyimide layer.

In some embodiments, the optical axis tunable liquid crystal lens further includes a black matrix. For example, the black matrix is configured to form an aperture that allows light transmit through. Optionally, the aperture is in a position corresponding to the central electrode 330. Optionally, the black matrix is between the first base substrate and the second base substrate. Optionally, the black matrix is on a side of the first base substrate away from the second base substrate. Optionally, the black matrix is on a side of the second base substrate away from the first base substrate. The black matrix can be used to define an effective area (predetermined light exiting area) of the light transmissive structure, reduce or eliminate the emission of stray light (non-compliant light); moreover, the black matrix can also partially shield an electrode (e.g., the second electrode), reducing reflection of ambient light by the electrode, improving optical performance of the lens structure.

Referring to FIG. 1A and FIG. 1B, the optical axis tunable liquid crystal lens in some embodiments includes a black matrix 600 defining an aperture 601. The black matrix 600 is between the first base substrate 110 and the first electrode 310. Referring to FIG. 1B, an orthographic projection of the aperture 601 on the first base substrate 110 covers an orthographic projection of the central electrode 330 on the first base substrate 110. Optionally, the orthographic projection of the aperture 601 on the first base substrate 110 has a same shape as the orthographic projection of the central electrode 330 on the first base substrate 110, for example, both are circular shapes, to achieve an evenly distributed light transmission from the optical axis tunable liquid crystal lens.

Optionally, an orthographic projection of the black matrix 600 on the first base substrate 110 covers an orthographic projection of the second electrode 320. Optionally, the second electrode 320 is made of an opaque material.

In some embodiments, the optical axis tunable liquid crystal lens further includes a dielectric layer on the first base substrate, on the second base substrate, or on both. The dielectric layer functions as an insulating layer as well as a planarization layer. Referring to FIG. 1A and FIG. 1B, the optical axis tunable liquid crystal lens in some embodiments includes a first dielectric layer 510 on the first base substrate 110 and a second dielectric layer 520 on the second base substrate 120. The first dielectric layer 510 is on a side of the black matrix 600 away from the first base substrate 110, planarizing the lens structure on which the first alignment film 410 is formed. The second dielectric layer 520 is on a side of the second electrode 320 (optionally the central electrode 330) away from the second base substrate 120, planarizing the lens structure on which the second alignment film 420 is formed. Optionally, the first dielectric layer 510 and the second dielectric layer 520 are made of one or a combination of silicon nitride, silicon oxide, or silicon oxynitride.

Figure 6A:
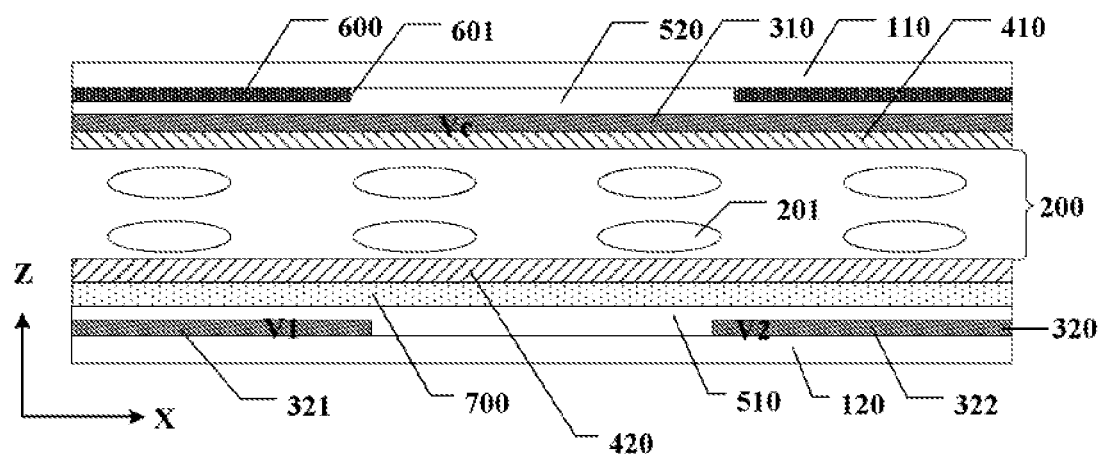
FIG. 6A is a cross-sectional view of an optical axis tunable liquid crystal lens in some embodiments according to the present disclosure.
Figure 6B:
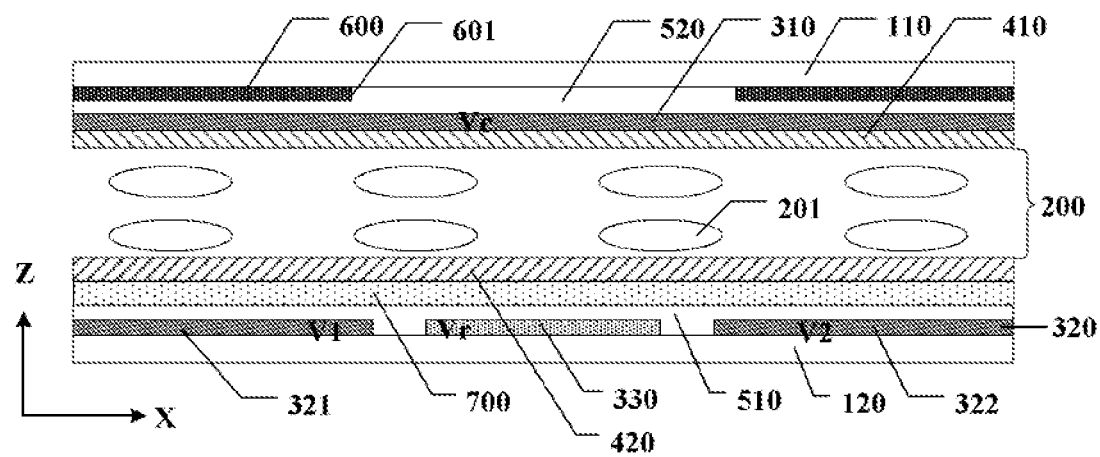
FIG. 6B is a cross-sectional view of an optical axis tunable liquid crystal lens in some embodiments according to the present disclosure.

In some embodiments, the optical axis tunable liquid crystal lens further includes a high impedance layer, e.g., between the liquid crystal layer and the first electrode, or between the liquid crystal layer and the second electrode, or between the liquid crystal layer and the central electrode. FIG. 6A is a cross-sectional view of an optical axis tunable liquid crystal lens in some embodiments according to the present disclosure. FIG. 6B is a cross-sectional view of an optical axis tunable liquid crystal lens in some embodiments according to the present disclosure. Referring to FIG. 6A and FIG. 6B, the optical axis tunable liquid crystal lens in some embodiments further includes a high impedance layer 700 between the second alignment film 420 and the second dielectric layer 520. The high impedance layer 700 can enhance the uniformity of the electric field distribution produced by the electrodes (e.g., the second electrode 320), for example, the high impedance layer 700 causes the electric field in the lens structure to be a gradient electric field.

Various appropriate materials may be used for making the high impedance layer 700. Examples of appropriate materials for making the high impedance layer 700 include zinc oxide and indium tin oxide. Optionally, the high impedance layer 700 has a thickness in a range of 10 nm to 25 nm, e.g., 12.5 nm, 15 nm, 17.5 nm, 20 nm, 22.5 nm. Optionally, the high impedance layer 700 has a square resistance in a range of $10^7 \Omega/\square$ to $10^9 \Omega/\square$. Under the above conditions, the high impedance layer 700 can enhance a more even electric field distribution. By having a high impedance layer 700 of relatively small thickness, the separation distance between the first electrode 310 and the second electrode 320, and the separation distance between the first electrode 310 and the central electrode 330, can be maintained relatively small, in turn requiring a relatively small driving voltage. Optionally, the driving voltage is less than 5 volts, e.g., less than 3.5 volts.

In another aspect, the present disclosure provides an electronic apparatus having the optical axis tunable liquid crystal lens described herein. For example, the electronic apparatus may be an imaging apparatus such as a video camera, the lens structure may be an optical device for zooming in the imaging device, or the like. In another example, the electronic apparatus may be a display apparatus, and the lens structure may be used to control the light output direction of the display image.

In another aspect, the present disclosure provides a display apparatus having multiple ones of the optical axis tunable liquid crystal lens described herein, and a display panel having a plurality of subpixels. Optionally, light emitted from the plurality of subpixels is configured to transmit through the multiple ones of the optical axis tunable liquid crystal lens. The multiple ones of the optical axis tunable liquid crystal lens are disposed on light emitting side of the display panel. In one example, each of the multiple ones of the optical axis tunable liquid crystal lens corresponds to two adjacent subpixels of the plurality of subpixels. In another example, each of the multiple ones of the optical axis tunable liquid crystal lens corresponds to two adjacent pixels of a plurality of pixels. In another example, the display apparatus is a three-dimensional display apparatus for display a parallax image, and can be switched between a two-dimensional display mode and a three-dimensional display mode.

Figure 7:
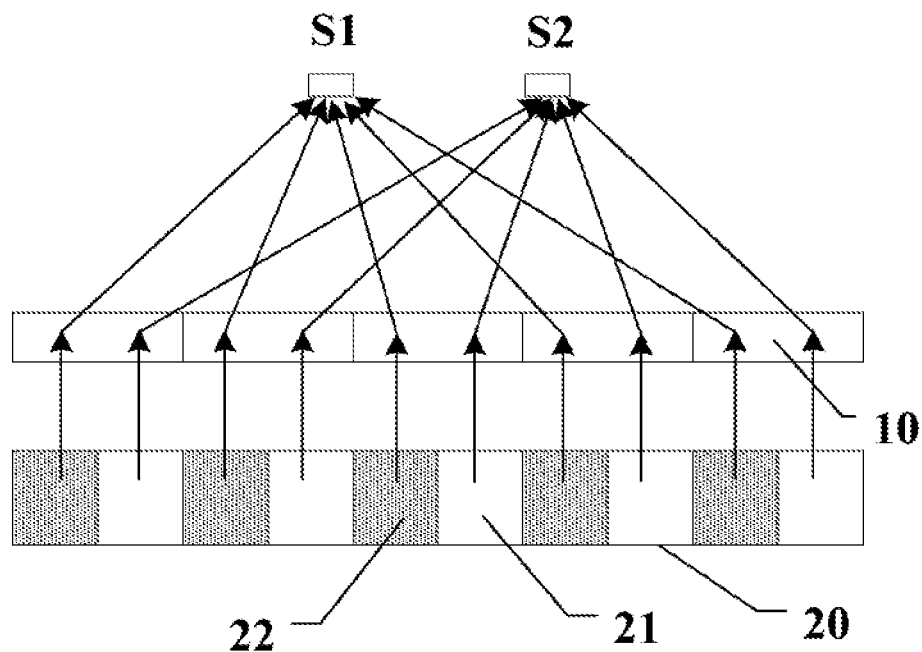
FIG. 7 is a cross-sectional view of a display apparatus in some embodiments according to the present disclosure.

FIG. 7 is a cross-sectional view of a display apparatus in some embodiments according to the present disclosure. Referring to FIG. 7, the display apparatus includes a display panel 20 and multiple ones of the optical axis tunable liquid crystal lens 10. The display panel 20 include a plurality of subpixels, e.g., a first subpixel 21 and a second subpixel 22. In one example, a respective one of the multiple ones of the optical axis tunable liquid crystal lens 10 corresponds to a first subpixel 21 and a second subpixel 22. During image display, light emitted from the first subpixel 21 transmits through the respective one of the multiple ones of the optical axis tunable liquid crystal lens 10, and is received by a second view zone S2 (e.g., a right eye), light emitted from the second subpixel 22 transmits through the respective one of the multiple ones of the optical axis tunable liquid crystal lens 10, and is received by a first view zone S1 (e.g., a left eye). The display apparatus displays a parallax image, e.g., the display apparatus can be used as a naked-eye three-dimensional display apparatus.

Further, as shown in FIG. 7, when the first view zone S1 and the second view zone S2 undergo movement relative to the display apparatus, a position of the optical axis of the respective one of the multiple ones of the optical axis tunable liquid crystal lens 10 can be adjusted. Accordingly, a direction of light emitted from the respective one of the multiple ones of the optical axis tunable liquid crystal lens 10 can be adjusted in response to the relative movement of the first view zone S1 and the second view zone S2. As a result, the respective one of the multiple ones of the optical axis tunable liquid crystal lens 10 is configured to direct light emitted from the first subpixel 21 to the second view zone S2, and direct light emitted from the second subpixel 22 to the first view zone S1, following the relative movement of the first view zone S1 and the second view zone S2 in real time. By having the present optical axis tunable liquid crystal lens, a clear three-dimensional image can be viewed, for example, even when the display apparatus is shaken.

In some embodiments, a respective one of the multiple ones of the optical axis tunable liquid crystal lens 10 corresponds a single subpixel, e.g., in a one-to-one correspondence relationship. For example, a first one of the multiple ones of the optical axis tunable liquid crystal lens 10 corresponds the first subpixel 21, and a second one of the multiple ones of the optical axis tunable liquid crystal lens 10 corresponds the second subpixel 22. In one example, the optical axis of the respective one of the multiple ones of the optical axis tunable liquid crystal lens 10 is shifted to a position that is covered by the black matrix, only one of the view zones is configured to receive light transmitted through the respective one of the multiple ones of the optical axis tunable liquid crystal lens 10. For example, the first view zone S1 is configured to receive light transmitted through the first one of the multiple ones of the optical axis tunable liquid crystal lens 10, and the second view zone S2 is configured to receive light transmitted through the second one of the multiple ones of the optical axis tunable liquid crystal lens 10. The display apparatus is configured to display a parallax image, thereby enabling the three-dimensional image display.

Optionally, the multiple ones of the optical axis tunable liquid crystal lens 10 are formed as an integral structure.

In some embodiments, the display panel is a liquid crystal display panel having an array substrate and a counter substrate facing the array substrate. The array substrate and the counter substrate are assembled into a cell, and a liquid crystal material is filled in the cell. Optionally, the counter substrate is a color filter substrate having a color filter. Optionally, a pixel electrode of each subpixel in the array substrate is configured to apply an electric filed to control the degree of rotation of the liquid crystal material, thereby displaying an image.

In some embodiments, the display panel is an organic light emitting diode display panel having an array substrate and a counter substrate facing the array substrate. Optionally, a plurality of organic light emitting diodes are formed in the array substrate. Each of the plurality of organic light emitting diodes includes multiple organic layers stacked together. A cathode and an anode of each of the plurality of organic light emitting diodes are configured to drive light emission of the organic layers.

In some embodiments, the display panel is an electronic paper display panel having an array substrate and a counter substrate facing the array substrate. Optionally, an electronic ink layer is formed in the array substrate. Optionally, a pixel electrode of each subpixel in the array substrate is configured to apply a voltage to drive the movements of charged particles in the electronic ink layer, thereby displaying an image.

Figure 8A:
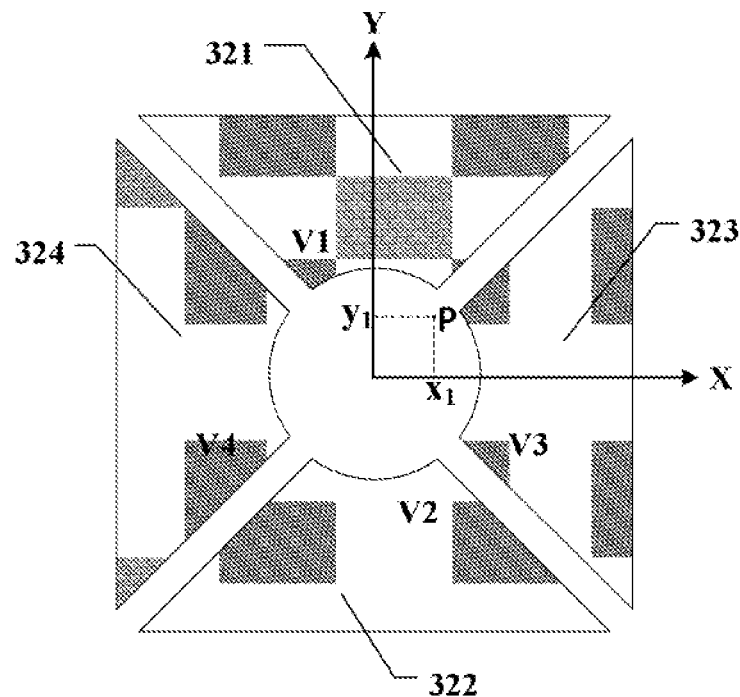
FIG. 8A illustrates a method of adjusting an optical axis of an optical axis tunable liquid crystal lens in some embodiments according to the present disclosure.

FIG. 8A illustrates a method of adjusting an optical axis of an optical axis tunable liquid crystal lens in some embodiments according to the present disclosure.

Figure 8B:
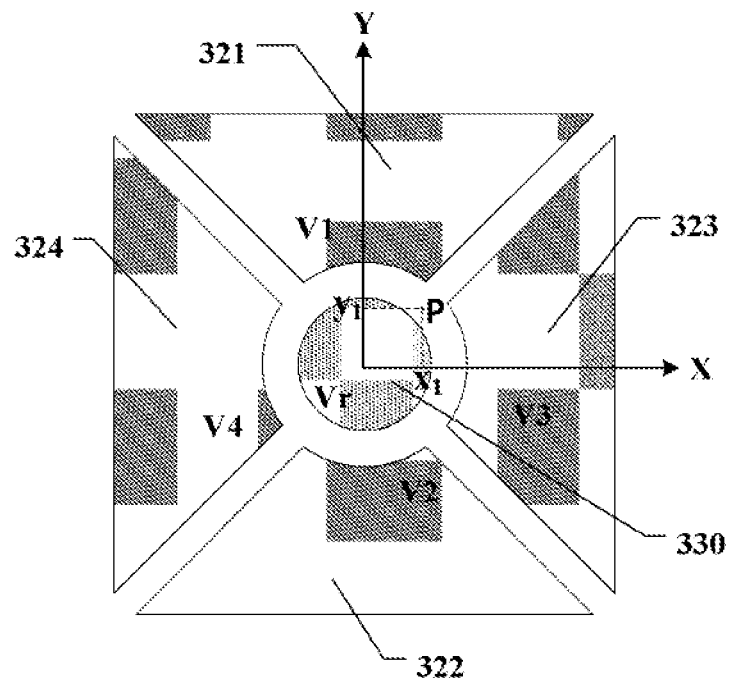
FIG. 8B illustrates a method of adjusting an optical axis of an optical axis tunable liquid crystal lens in some embodiments according to the present disclosure.

FIG. 8B illustrates a method of adjusting an optical axis of an optical axis tunable liquid crystal lens in some embodiments according to the present disclosure.

Figure 8C:
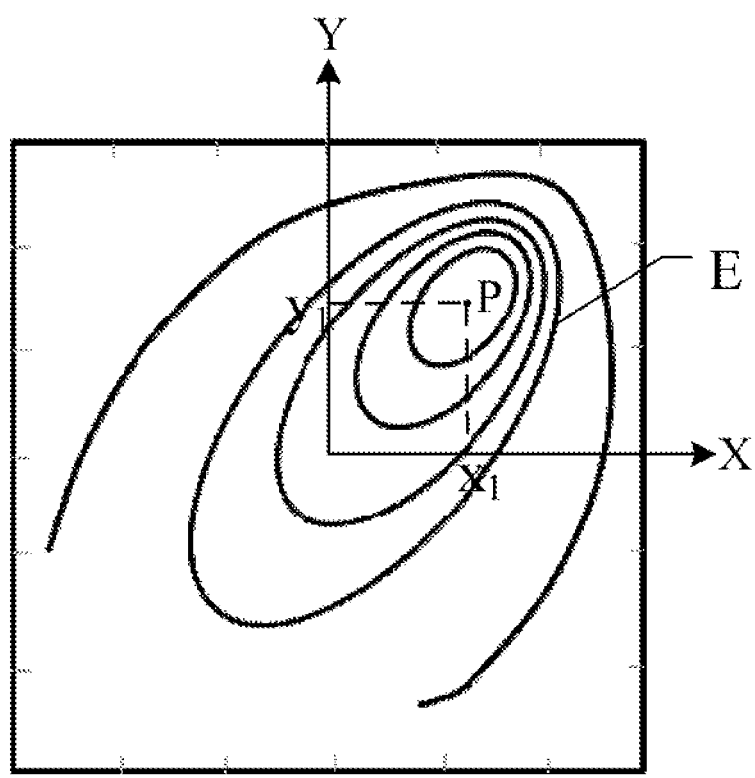
FIG. 8C illustrates an isomeric view of an electric field distribution in an optical axis tunable liquid crystal lens in some embodiments according to the present disclosure.

FIG. 8C illustrates an isomeric view of an electric field distribution in an optical axis tunable liquid crystal lens in some embodiments according to the present disclosure.

In another aspect, the present disclosure provides a method of operating an optical axis tunable liquid crystal lens. In some embodiments, the method includes providing a liquid crystal lens including a liquid crystal layer and a control electrode, the control electrode including a first electrode and a second electrode, the first electrode is on a side of the liquid crystal layer away from the second electrode, the second electrode including a first sub-electrode and a second sub-electrode spaced apart from each other and being on two opposite sides with respect to a center of the second electrode, the first sub-electrode and the second sub-electrode being independently addressable; applying a common voltage signal to the first electrode; applying a first voltage signal to the first sub-electrode; applying a second voltage signal to the second sub-electrode; and adjusting a relative position of an optical axis of the liquid crystal lens comprising independently adjusting a first voltage difference between the common voltage signal and the first voltage signal and a second voltage difference between the common voltage signal and the second voltage signal.

The liquid crystal molecules have birefringence characteristics, and an electric field generated between the first electrode, the second electrode, and the central electrode can control the rotation of the liquid crystal molecules, thereby controlling the refractive index of the liquid crystal layer. When the first electrode is applied with a common voltage signal, and the second electrode is applied with a control voltage, a liquid crystal lens is formed.

In some embodiments, the step of adjusting the optical axis of the liquid crystal lens includes adjusting a difference between the first voltage difference and the second voltage difference. The optical axis is shifted toward the first sub-electrode relative to the second sub-electrode when the first voltage difference is increased relative to the second voltage difference. The optical axis is shifted toward the second sub-electrode relative to the first sub-electrode when the second voltage difference is increased relative to the first voltage difference.

Optionally, the step of adjusting the optical axis of the liquid crystal lens includes controlling the first voltage difference to be greater than the second voltage difference thereby rendering a first shortest distance between the optical axis and an edge of the first sub-electrode on a plane containing the first sub-electrode and the second sub-electrode to be less than a second shortest distance between the optical axis and an edge of the second sub-electrode on the plane containing the first sub-electrode and the second sub-electrode. Optionally, the step of adjusting the optical axis of the liquid crystal lens includes controlling the second voltage difference to be greater than the first voltage difference thereby rendering a second shortest distance between the optical axis and an edge of the second sub-electrode on a plane containing the first sub-electrode and the second sub-electrode to be less than a first shortest distance between the optical axis and an edge of the first sub-electrode on the plane containing the first sub-electrode and the second sub-electrode.

Optionally, the first sub-electrode and the second sub-electrode have a centro-symmetry with respect to the central electrode.

In some embodiments, the control electrode further includes a central electrode on a side of the liquid crystal layer away from the first electrode. Optionally, an orthographic projection of the first sub-electrode on the liquid crystal layer and an orthographic projection of the second sub-electrode on the liquid crystal layer being respectively on two opposite sides of an orthographic projection of the central electrode on the liquid crystal layer. The method further includes applying a central voltage signal to the central electrode.

In some embodiments, a voltage difference between the second electrode and the first electrode and a voltage difference between the central electrode and the first electrode are not equal. Along a direction from the second electrode to the central electrode, the refractive index of the liquid crystal layer in a region corresponding to the second electrode is different from the refractive index of the liquid crystal layer in a region corresponding to the central electrode, thereby forming a liquid crystal lens.

In some embodiments, the second electrode includes a total number of N sub-electrodes, N≥2. Optionally, orthographic projections of the N sub-electrodes on the liquid crystal layer surround the orthographic projection of the central electrode on the liquid crystal layer. Optionally, the orthographic projections of the N sub-electrodes on the liquid crystal layer are equally spaced apart from each other. In some embodiments, the method includes forming a convex liquid crystal lens by controlling a central voltage difference between the central voltage signal and the common voltage signal to be less than a voltage difference between the common voltage signal and a voltage signal applied to any one of the N sub-electrodes. By controlling the central voltage difference less than the voltage difference between the common voltage signal and a voltage signal applied to any one of the N sub-electrodes, the refractive index of the liquid crystal layer increases along a direction from a respective one of the N sub-electrodes to the central electrode. Accordingly, a strength of the electrical field decreases along the direction from the respective one of the N sub-electrodes to the central electrode.

In some embodiments, the second electrode includes a total number of N sub-electrodes, N≥2. Optionally, orthographic projections of the N sub-electrodes on the liquid crystal layer surround the orthographic projection of the central electrode on the liquid crystal layer. Optionally, the orthographic projections of the N sub-electrodes on the liquid crystal layer are equally spaced apart from each other. In some embodiments, the method includes forming a concave liquid crystal lens by controlling a central voltage difference between the central voltage signal and the common voltage signal to be greater than a voltage difference between the common voltage signal and a voltage signal applied to any one of the N sub-electrodes. By controlling the central voltage difference greater than the voltage difference between the common voltage signal and a voltage signal applied to any one of the N sub-electrodes, the refractive index of the liquid crystal layer decreases along a direction from a respective one of the N sub-electrodes to the central electrode. Accordingly, a strength of the electrical field increases along the direction from the respective one of the N sub-electrodes to the central electrode.

In some embodiments, a same voltage signal is applied to all of the N sub-electrodes of the second electrode. Accordingly, the optical axis of the optical axis tunable liquid crystal lens is at a center position of the second electrode (without considering the error caused by the process factor). In one example, each of the N sub-electrodes of the second electrode, and the central electrode, have a regular shape; and the N sub-electrodes of the second electrode are arranged to have a centro-symmetry with respect to a center of the central electrode (e.g., in a ring-shape arrangement), the optical axis substantially coincides with the center of the central electrode. In another example, by adjusting the magnitudes of the voltages on the N sub-electrodes of the second electrode and the central electrode, the refractive index difference between the edge portion and the central portion of the liquid crystal lens can be adjusted, thereby adjusting the focus position of the liquid crystal lens.

In some embodiments, the second electrode includes a first sub-electrode, a second sub-electrode, a third sub-electrode, and a fourth sub-electrode. Optionally, the first sub-electrode and the second sub-electrode are on two opposite sides (e.g., a first side and a second side) with respect to the center of the second electrode, and the third sub-electrode and the fourth sub-electrode are on two opposite sides (e.g., a third side and a fourth side) with respect to the center of the second electrode. The first sub-electrode, the second sub-electrode, the third sub-electrode, and the fourth sub-electrode are independently addressable.

In some embodiments, the method includes applying a common voltage signal to the first electrode; applying a first voltage signal to the first sub-electrode; applying a second voltage signal to the second sub-electrode; applying a third voltage signal to the third sub-electrode; and applying a fourth voltage signal to the fourth sub-electrode. Optionally, the step of adjusting the relative position of the optical axis of the liquid crystal lens includes independently adjusting a first voltage difference between the common voltage signal and the first voltage signal, a second voltage difference between the common voltage signal and the second voltage signal, a third voltage difference between the common voltage signal and the third voltage signal, and a fourth voltage difference between the common voltage signal and the fourth voltage signal.

In some embodiments, the step of adjusting the optical axis of the liquid crystal lens includes adjusting a difference between the first voltage difference and the second voltage difference, and adjusting a difference between the third voltage difference and the fourth voltage difference. Optionally, the optical axis is shifted toward the first sub-electrode relative to the second sub-electrode when the first voltage difference is increased relative to the second voltage difference, and shifted toward the third sub-electrode relative to the fourth sub-electrode when the third voltage difference is increased relative to the fourth voltage difference. Optionally, the optical axis is shifted toward the second sub-electrode relative to the first sub-electrode when the second voltage difference is increased relative to the first voltage difference, and shifted toward the fourth sub-electrode relative to the third sub-electrode when the fourth voltage difference is increased relative to the third voltage difference. Optionally, the optical axis is shifted toward the first sub-electrode relative to the second sub-electrode when the first voltage difference is increased relative to the second voltage difference, and shifted toward the fourth sub-electrode relative to the third sub-electrode when the fourth voltage difference is increased relative to the third voltage difference. Optionally, the optical axis is shifted toward the second sub-electrode relative to the first sub-electrode when the second voltage difference is increased relative to the first voltage difference, and shifted toward the third sub-electrode relative to the fourth sub-electrode when the third voltage difference is increased relative to the fourth voltage difference.

In some embodiments, the step of adjusting the optical axis of the liquid crystal lens includes one or a combination of the following: (1) controlling the first voltage difference to be greater than the second voltage difference thereby rendering a first shortest distance between the optical axis and an edge of the first sub-electrode on a plane containing the first sub-electrode and the second sub-electrode to be less than a second shortest distance between the optical axis and an edge of the second sub-electrode on the plane containing the first sub-electrode and the second sub-electrode; (2) controlling the second voltage difference to be greater than the first voltage difference thereby rendering a second shortest distance between the optical axis and an edge of the second sub-electrode on a plane containing the first sub-electrode and the second sub-electrode to be less than a first shortest distance between the optical axis and an edge of the first sub-electrode on the plane containing the first sub-electrode and the second sub-electrode; (3) controlling the third voltage difference to be greater than the fourth voltage difference thereby rendering a third shortest distance between the optical axis and an edge of the third sub-electrode on a plane containing the third sub-electrode and the fourth sub-electrode to be less than a fourth shortest distance between the optical axis and an edge of the fourth sub-electrode on the plane containing the third sub-electrode and the fourth sub-electrode; and (4) controlling the fourth voltage difference to be greater than the third voltage difference thereby rendering a fourth shortest distance between the optical axis and an edge of the fourth sub-electrode on a plane containing the third sub-electrode and the fourth sub-electrode to be less than a third shortest distance between the optical axis and an edge of the third sub-electrode on the plane containing the third sub-electrode and the fourth sub-electrode. Optionally, the plane containing the first sub-electrode and the second sub-electrode and the plane containing the third sub-electrode and the fourth sub-electrode are co-planar.

In some embodiments, the control electrode further includes a central electrode on a side of the liquid crystal layer away from the first electrode. Optionally, an orthographic projection of the first sub-electrode on the liquid crystal layer and an orthographic projection of the second sub-electrode on the liquid crystal layer are respectively on a first side and a second side of an orthographic projection of the central electrode on the liquid crystal layer, the first side being opposite to the second side. Optionally, an orthographic projection of the third sub-electrode on the liquid crystal layer and an orthographic projection of the fourth sub-electrode on the liquid crystal layer are respectively on a third side and a fourth side of the orthographic projection of the central electrode on the liquid crystal layer, the third side being opposite to the fourth side. Optionally, the method further includes applying a central voltage signal to the central electrode.

FIG. 8A illustrates a method of adjusting an optical axis of an optical axis tunable liquid crystal lens in some embodiments according to the present disclosure. Referring to FIG. 8A, the second electrode includes a first sub-electrode 321, a second sub-electrode 322, a third sub-electrode 323, and a fourth sub-electrode 324. Optionally, the first sub-electrode 321 and the second sub-electrode 322 are on two opposite sides (e.g., a first side and a second side) with respect to the center of the second electrode, and the third sub-electrode 323 and the fourth sub-electrode 324 are on two opposite sides (e.g., a third side and a fourth side) with respect to the center of the second electrode. The first sub-electrode 321, the second sub-electrode 322, the third sub-electrode 323, and the fourth sub-electrode 324 are independently addressable. FIG. 8B illustrates a method of adjusting an optical axis of an optical axis tunable liquid crystal lens in some embodiments according to the present disclosure. Referring to FIG. 8B, the control electrode further includes a central electrode 330 substantially surrounded by the second electrode. FIG. 8C illustrates an isomeric view of an electric field distribution in an optical axis tunable liquid crystal lens in some embodiments according to the present disclosure. Referring to FIG. 8A, FIG. 8B, and FIG. 8C, an optical axis of the optical axis tunable liquid crystal lens is shifted to position P. Referring to FIG. 8C, a plurality of equipotential lines E depict the electric field distribution. For example, a strength of the electric field on a respective one of the plurality of equipotential lines E is the same.

Referring to FIG. 8A and FIG. 8B, a X-Y coordinate system is depicted, the origin of which is at the center of the second electrode (FIG. 8A), or at the center of the central electrode 330 (FIG. 8B). The X-direction is along the fourth sub-electrode 324 to the third sub-electrode 323, and the Y-direction is along the second sub-electrode 322 to the first sub-electrode 321.

Referring to FIG. 8A, when a first voltage difference between the common voltage signal and the first voltage signal V1, a second voltage difference between the common voltage signal and the second voltage signal V2, a third voltage difference between the common voltage signal and the third voltage signal V3, and a fourth voltage difference between the common voltage signal and the fourth voltage signal V3 are the same, the optical axis of the optical axis tunable liquid crystal lens is substantially at the origin of the X-Y coordinate system, e.g., at the center of the second electrode.

Referring to FIG. 8B, when a first voltage difference between the common voltage signal and the first voltage signal V1, a second voltage difference between the common voltage signal and the second voltage signal V2, a third voltage difference between the common voltage signal and the third voltage signal V3, a fourth voltage difference between the common voltage signal and the fourth voltage signal V3, and a central voltage difference between the common voltage signal and the central voltage signal Vr, a liquid crystal lens is not formed because a horizontal electric field between the second electrode and the central electrode is not formed.

Referring to FIG. 8B, when the first voltage difference, the second voltage difference, the third voltage difference, and the fourth voltage difference are substantially the same, but different from the central voltage difference, a liquid crystal lens is formed because a horizontal electric field between the second electrode and the central electrode is formed. The optical axis of the optical axis tunable liquid crystal lens is substantially at the origin of the X-Y coordinate system, e.g., at the center of the second electrode or at the center of the central electrode. In one example, the equipotential lines of the electric field in the optical axis tunable liquid crystal lens are concentric rings centered on the center of the central electrode 330.

Referring to FIG. 8A, the optical axis of the optical axis tunable liquid crystal lens can be controlled to shift toward any desired direction. In one example, the optical axis is shifted toward the first sub-electrode 321 relative to the second sub-electrode 322 when the first voltage difference is increased relative to the second voltage difference (and the third voltage difference is the same as the fourth voltage difference), e.g., as shown in FIG. 8A, shifted to a position (0, y1). In another example, the optical axis is shifted toward the third sub-electrode 323 relative to the fourth sub-electrode 324 when the third voltage difference is increased relative to the fourth voltage difference (and the first voltage difference is the same as the second voltage difference), e.g., as shown in FIG. 8A, shifted to a position (x1, 0). In another example, the optical axis is shifted toward the first sub-electrode 321 relative to the second sub-electrode 322 and shifted toward the third sub-electrode 323 relative to the fourth sub-electrode 324 when the first voltage difference is increased relative to the second voltage difference and the third voltage difference is increased relative to the fourth voltage difference, e.g., as shown in FIG. 8A, shifted to a position P (x1, y1). When the first voltage difference is the same as the third voltage difference, and the second voltage difference is the same as the fourth voltage difference, x1=y1.

Referring to FIG. 8B, when the first voltage difference, the second voltage difference, the third voltage difference, and the fourth voltage difference are substantially the same, but different from the central voltage difference, a liquid crystal lens is formed. The optical axis of the optical axis tunable liquid crystal lens can be controlled to shift toward any desired direction. In one example, the optical axis is shifted toward the first sub-electrode 321 relative to the second sub-electrode 322 when the first voltage difference is increased relative to the second voltage difference (and the third voltage difference is the same as the fourth voltage difference), e.g., as shown in FIG. 8A, shifted to a position (0, y1). In another example, the optical axis is shifted toward the third sub-electrode 323 relative to the fourth sub-electrode 324 when the third voltage difference is increased relative to the fourth voltage difference (and the first voltage difference is the same as the second voltage difference), e.g., as shown in FIG. 8A, shifted to a position (x1, 0). In another example, the optical axis is shifted toward the first sub-electrode 321 relative to the second sub-electrode 322 and shifted toward the third sub-electrode 323 relative to the fourth sub-electrode 324 when the first voltage difference is increased relative to the second voltage difference and the third voltage difference is increased relative to the fourth voltage difference, e.g., as shown in FIG. 8A, shifted to a position P (x1, y1). When the first voltage difference is the same as the third voltage difference, and the second voltage difference is the same as the fourth voltage difference, x1=y1.

In another aspect, the present disclosure provides a method of fabricating an optical axis tunable liquid crystal lens. In some embodiments, the method includes forming a first electrode on a first base substrate; forming a second electrode on a second base substrate; assembling the first base substrate and the second base substrate together into a cell; filling a liquid crystal material into the cell thereby forming a liquid crystal layer. The step of forming the second electrode includes forming a first sub-electrode and a second sub-electrode spaced apart from each other and being on two opposite sides with respect to a center of the second electrode, the first sub-electrode and the second sub-electrode formed to be independently addressable, the first sub-electrode configured to be provided with a first voltage signal and the second sub-electrode configured to be provided with a second voltage signal.

In some embodiments, the method further includes forming a central electrode on the second base substrate. The central electrode is formed on a side of the liquid crystal layer away from the first electrode, and configured to be provided with a central voltage signal different from the first voltage signal and the second voltage signal. Optionally, the central electrode is formed so that an orthographic projection of the first sub-electrode on the first base substrate and an orthographic projection of the second sub-electrode on the first base substrate are respectively on two opposite sides of an orthographic projection of the central electrode on the first base substrate. Optionally, the central electrode and the second electrode are formed in a same layer, e.g., formed in a single patterning process using a single mask plate and made of a same material. Optionally, the first sub-electrode and the second sub-electrode are formed to have a centro-symmetry with respect to the central electrode.

In some embodiments, the step of forming the second electrode includes forming a total number of N sub-electrodes, N≥3. The N sub-electrodes are formed so that orthographic projections of the N sub-electrodes on the liquid crystal layer surround the orthographic projection of the central electrode on the liquid crystal layer, and the orthographic projections of the N sub-electrodes on the liquid crystal layer are equally spaced apart from each other.

In some embodiments, the step of forming the second electrode includes forming a first sub-electrode, a second sub-electrode, a third sub-electrode, and a fourth sub-electrode. The second electrode is formed so that an orthographic projection of the first sub-electrode on the liquid crystal layer and an orthographic projection of the second sub-electrode on the liquid crystal layer are respectively on a first side and a second side of an orthographic projection of the central electrode on the liquid crystal layer, the first side being opposite to the second side; and an orthographic projection of the third sub-electrode on the liquid crystal layer and an orthographic projection of the fourth sub-electrode on the liquid crystal layer are respectively on a third side and a fourth side of the orthographic projection of the central electrode on the liquid crystal layer, the third side being opposite to the fourth side.

Referring to FIG. 6, in some embodiments, the method includes providing a first base substrate 110, depositing a black material layer on the first base substrate 110, patterning the black material layer to form a black matrix 600 defining an aperture 601, and depositing an insulating material on the first base substrate 110 to form a first dielectric layer 510 covering the black matrix 600. The first dielectric layer 510 planarizes the surface of the first base substrate 110, e.g., a side of the first dielectric layer 510 away from the black matrix 600 is a substantially flat surface (planarized). Optionally, the method further includes depositing a conductive material layer on the first base substrate 110 (and optionally patterning the conductive material layer) to form a first electrode 310, depositing an insulating material film on a side of the first electrode 310 away from the first dielectric layer, and pre-aligning the insulating material film (e.g., by nano-imprinting or rubbing) to form a first alignment film 410.

In some embodiments, the method further includes providing a second base substrate 120, depositing a conductive material layer on the second base substrate 120, patterning the conductive material layer to forming a second electrode 320 and a central electrode 330. The second electrode 320 is formed to include at least a first sub-electrode 321 and a second sub-electrode 322. The central electrode 330 is formed between the first sub-electrode 321 and the second sub-electrode 322. Optionally, the method further includes depositing an insulating material on the second base substrate 120 to form a second dielectric layer 520. The second dielectric layer 520 planarizes the surface of the second base substrate 120, e.g., a side of the second dielectric layer 520 away from the second electrode 320 and the central electrode 330 is a substantially flat surface (planarized). Optionally, the method further includes depositing a high impedance material on a side of the second dielectric layer 520 away from the second electrode 320 and the central electrode 330, to form a high impedance layer 700, depositing an insulating material film on a side of the high impedance layer 700 away from the second electrode 320 and the central electrode 330, and pre-aligning the insulating material film (e.g., by nano-imprinting or rubbing) to form a second alignment film 420.

The method further includes assembling the first base substrate 110 and the second base substrate 120 into a cell, and providing a liquid crystal material between the first base substrate 110 and the second base substrate 120 to form a liquid crystal layer 200. Optionally, prior to assembling the first base substrate 110 and the second base substrate 120 into the cell, a sealant is formed in a peripheral region of the first base substrate 110 or the second base substrate 120. Optionally, subsequent to assembling the first base substrate 110 and the second base substrate 120 into the cell, the sealant is cured (e.g., by heat or UV light).

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical axis tunable liquid crystal lens, comprising:
a liquid crystal layer;
a control electrode configured to adjust an optical axis of the optical axis tunable liquid crystal lens;
a black matrix configured to define an aperture;
wherein the control electrode comprises a first electrode configured to be provided with a common voltage signal, a second electrode configured to be provided with a control voltage signal, and a central electrode on a side of the liquid crystal layer away from the first electrode;
the first electrode is on a side of the liquid crystal layer away from the second electrode; and
the second electrode comprises a first sub-electrode and a second sub-electrode spaced apart from each other and being on two opposite sides with respect to a center of the second electrode, the first sub-electrode and the second sub-electrode being independently addressable, the first sub-electrode configured to be provided with a first voltage signal and the second sub-electrode configured to be provided with a second voltage signal
the aperture is in a position corresponding to the central electrode;
an orthographic projection of the aperture on the liquid crystal layer covers an orthographic projection of the central electrode on the liquid crystal layer; and
an orthographic projection of the black matrix on the liquid crystal layer covers an orthographic projection of the second electrode on the liquid crystal layer.

2. The optical axis tunable liquid crystal lens of claim 1, wherein the central electrode is configured to be provided with a central voltage signal different from the first voltage signal and the second voltage signal; and
wherein an orthographic projection of the first sub-electrode on the liquid crystal layer and an orthographic projection of the second sub-electrode on the liquid crystal layer are respectively on two opposite sides of an orthographic projection of the central electrode on the liquid crystal layer.

3. The optical axis tunable liquid crystal lens of claim 1, further comprising:
a first dielectric layer on a side of the black matrix closer to the liquid crystal layer;
a second dielectric layer on a side of the second electrode and the central electrode closer to the liquid crystal layer; and
a high impedance layer between the liquid crystal layer and the second dielectric layer.

4. The optical axis tunable liquid crystal lens of claim 2, wherein the first sub-electrode and the second sub-electrode have a centro-symmetry with respect to the central electrode; and
the central electrode and the second electrode are in a same layer.

5. The optical axis tunable liquid crystal lens of claim 2, wherein the second electrode comprises a total number of N sub-electrodes, N≥3;
orthographic projections of the N sub-electrodes on the liquid crystal layer surround the orthographic projection of the central electrode on the liquid crystal layer; and
the orthographic projections of the N sub-electrodes on the liquid crystal layer are equally spaced apart from each other.

6. The optical axis tunable liquid crystal lens of claim 5, wherein the N sub-electrodes further comprises a third sub-electrode and a fourth sub-electrode; and
wherein an orthographic projection of the third sub-electrode on the liquid crystal layer and an orthographic projection of the fourth sub-electrode on the liquid crystal layer are respectively on two opposite sides of the orthographic projection of the central electrode on the liquid crystal layer.

7. The optical axis tunable liquid crystal lens of claim 5, wherein a central voltage difference between the central voltage signal and the common voltage signal is controlled to be less than a voltage difference between the common voltage signal and a voltage signal applied to any one of the N sub-electrodes.

8. The optical axis tunable liquid crystal lens of claim 5, wherein a central voltage difference between the central voltage signal and the common voltage signal is controlled to be greater than a voltage difference between the common voltage signal and a voltage signal applied to any one of the N sub-electrodes.

9. An electronic apparatus, comprising the optical axis tunable liquid crystal lens of claim 1.

10. A display apparatus, comprising multiple ones of the optical axis tunable liquid crystal lens of claim 1, and a display panel having a plurality of subpixels;
wherein light emitted from the plurality of subpixels is configured to transmit through the multiple ones of the optical axis tunable liquid crystal lens.

11. A method of operating an optical axis tunable liquid crystal lens, comprising:
providing a liquid crystal lens comprising a liquid crystal layer, a control electrode, and a black matrix configured to define an aperture; the control electrode comprising a first electrode, a second electrode, and a central electrode on a side of the liquid crystal layer away from the first electrode, the first electrode is on a side of the liquid crystal layer away from the second electrode, the second electrode comprising a first sub-electrode and a second sub-electrode spaced apart from each other and being on two opposite sides with respect to a center of the second electrode, the first sub-electrode and the second sub-electrode being independently addressable, the aperture is in a position corresponding to the central electrode, an orthographic projection of the aperture on the liquid crystal layer covers an orthographic projection of the central electrode on the liquid crystal layer, and an orthographic projection of the black matrix on the liquid crystal layer covers an orthographic projection of the second electrode on the liquid crystal layer;
applying a common voltage signal to the first electrode;
applying a first voltage signal to the first sub-electrode;
applying a second voltage signal to the second sub-electrode; and
adjusting a relative position of an optical axis of the liquid crystal lens comprising independently adjusting a first voltage difference between the common voltage signal and the first voltage signal and a second voltage difference between the common voltage signal and the second voltage signal.

12. The method of claim 11, wherein adjusting the optical axis of the liquid crystal lens comprises adjusting a difference between the first voltage difference and the second voltage difference; and
wherein the optical axis is shifted toward the first sub-electrode relative to the second sub-electrode when the first voltage difference is increased relative to the second voltage difference.

13. The method of claim 11, wherein adjusting the optical axis of the liquid crystal lens comprises controlling the first voltage difference to be greater than the second voltage difference thereby rendering a first shortest distance between the optical axis and an edge of the first sub-electrode on a plane containing the first sub-electrode and the second sub-electrode to be less than a second shortest distance between the optical axis and an edge of the second sub-electrode on the plane containing the first sub-electrode and the second sub-electrode.

14. The method of claim 11, wherein an orthographic projection of the first sub-electrode on the liquid crystal layer and an orthographic projection of the second sub-electrode on the liquid crystal layer being respectively on two opposite sides of an orthographic projection of the central electrode on the liquid crystal layer;

the method further comprises applying a central voltage signal to the central electrode.

15. The method of claim 14, wherein the second electrode comprises a total number of N sub-electrodes, $N \geq 2$;

orthographic projections of the N sub-electrodes on the liquid crystal layer surround the orthographic projection of the central electrode on the liquid crystal layer; and the orthographic projections of the N sub-electrodes on the liquid crystal layer are equally spaced apart from each other;

wherein the method comprises forming a convex liquid crystal lens by controlling a central voltage difference between the central voltage signal and the common voltage signal to be less than a voltage difference between the common voltage signal and a voltage signal applied to any one of the N sub-electrodes.

16. The method of claim 14, wherein the second electrode comprises a total number of N sub-electrodes, $N \geq 2$;

orthographic projections of the N sub-electrodes on the liquid crystal layer surround the orthographic projection of the central electrode on the liquid crystal layer; and the orthographic projections of the N sub-electrodes on the liquid crystal layer are equally spaced apart from each other;

wherein the method comprises forming a concave liquid crystal lens by controlling a central voltage difference between the central voltage signal and the common voltage signal to be greater than a voltage difference between the common voltage signal and a voltage signal applied to any one of the N sub-electrodes.

17. The method of claim 11, wherein the second electrode further comprises a third sub-electrode and a fourth sub-electrode and being on two opposite sides with respect to the center of the second electrode, the third sub-electrode and the fourth sub-electrode being independently addressable;

wherein the method comprises:

applying a third voltage signal to the third sub-electrode; and applying a fourth voltage signal to the fourth sub-electrode;

wherein adjusting the relative position of the optical axis of the liquid crystal lens further comprises independently adjusting a third voltage difference between the common voltage signal and the third voltage signal and a fourth voltage difference between the common voltage signal and the fourth voltage signal.

18. The method of claim 17, wherein adjusting the optical axis of the liquid crystal lens comprises adjusting a difference between the first voltage difference and the second voltage difference, and adjusting a difference between the third voltage difference and the fourth voltage difference; and wherein the optical axis is shifted toward the first sub-electrode relative to the second sub-electrode when the first voltage difference is increased relative to the second voltage difference, and shifted toward the third sub-electrode relative to the fourth sub-electrode when the third voltage difference is increased relative to the fourth voltage difference.

19. The method of claim 17, wherein adjusting the optical axis of the liquid crystal lens comprises controlling the first voltage difference to be greater than the second voltage difference thereby rendering a first shortest distance between the optical axis and an edge of the first sub-electrode on a plane containing the first sub-electrode and the second sub-electrode to be less than a second shortest distance between the optical axis and an edge of the second sub-electrode on the plane containing the first sub-electrode and the second sub-electrode, and controlling the third voltage difference to be greater than the fourth voltage difference thereby rendering a third shortest distance between the optical axis and an edge of the third sub-electrode on a plane containing the third sub-electrode and the fourth sub-electrode to be less than a fourth shortest distance between the optical axis and an edge of the fourth sub-electrode on the plane containing the third sub-electrode and the fourth sub-electrode.

20. The method of claim 17, wherein the control electrode further comprises a central electrode on a side of the liquid crystal layer away from the first electrode;

an orthographic projection of the first sub-electrode on the liquid crystal layer and an orthographic projection of the second sub-electrode on the liquid crystal layer are respectively on a first side and a second side of an orthographic projection of the central electrode on the liquid crystal layer, the first side being opposite to the second side; and an orthographic projection of the third sub-electrode on the liquid crystal layer and an orthographic projection of the fourth sub-electrode on the liquid crystal layer are respectively on a third side and a fourth side of the orthographic projection of the central electrode on the liquid crystal layer, the third side being opposite to the fourth side;

the method further comprises applying a central voltage signal to the central electrode.

* * * * *